United States Patent
Yang et al.

(10) Patent No.: US 11,859,807 B2
(45) Date of Patent: *Jan. 2, 2024

(54) VANITY MIRROR

(71) Applicant: simplehuman, LLC, Torrance, CA (US)

(72) Inventors: Frank Yang, Rancho Palos Verdes, CA (US); David Wolbert, Manhattan Beach, CA (US); Joseph Sandor, Newport Beach, CA (US); Orlando Cardenas, Laguna Niguel, CA (US); Frederick N. Bushroe, Tucson, AZ (US)

(73) Assignee: simplehuman, LLC, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/145,475

(22) Filed: Dec. 22, 2022

(65) Prior Publication Data
US 2023/0204201 A1 Jun. 29, 2023

Related U.S. Application Data

(63) Continuation of application No. 17/664,781, filed on May 24, 2022, now Pat. No. 11,566,784, which is a
(Continued)

(51) Int. Cl.
*F21V 33/00* (2006.01)
*A47G 1/02* (2006.01)
(Continued)

(52) U.S. Cl.
CPC ............ *F21V 33/004* (2013.01); *A45D 42/10* (2013.01); *A47G 1/02* (2013.01); *F21V 11/00* (2013.01);
(Continued)

(58) Field of Classification Search
CPC .......... F21V 33/004; A45D 42/10; A47G 1/02
See application file for complete search history.

(56) References Cited

U.S. PATENT DOCUMENTS

D44,537 S 8/1913 McIsaac
D51,556 S 12/1917 Hawthorne
(Continued)

FOREIGN PATENT DOCUMENTS

AU 356220 7/2014
AU 358072 10/2014
(Continued)

OTHER PUBLICATIONS

U.S. Appl. No. 15/073,990, filed Mar. 18, 2016, Yang et al.
(Continued)

*Primary Examiner* — Christopher E Dunay
(74) *Attorney, Agent, or Firm* — Knobbe, Martens, Olson & Bear, LLP

(57) ABSTRACT

A mirror assembly can include a housing, a mirror, and a light source. In certain embodiments, the mirror includes a light pipe configured to emit a substantially constant amount of light along a periphery of the mirror. In some embodiments, the mirror assembly includes a sensor assembly. The sensor assembly can be configured to adjust the amount of emitted light based on the position of a user in relation to the mirror. Certain embodiments of the mirror include an algorithm to adjust light based on the position of a user relative to the mirror, the level of ambient light, and/or the activation of different light modes.

19 Claims, 13 Drawing Sheets

Related U.S. Application Data continuation of application No. 16/923,994, filed on Jul. 8, 2020, now Pat. No. 11,371,692, which is a continuation of application No. 15/863,586, filed on Jan. 5, 2018, now Pat. No. 10,746,394, which is a continuation of application No. 13/783,109, filed on Mar. 1, 2013, now Pat. No. 9,897,306.

(60) Provisional application No. 61/608,584, filed on Mar. 8, 2012.

(51) Int. Cl.
  *A45D 42/10* (2006.01)
  *F21V 11/00* (2015.01)
  *F21V 8/00* (2006.01)

(52) U.S. Cl.
  CPC ........ *F21V 33/0004* (2013.01); *G02B 6/0096* (2013.01); *A47G 2200/08* (2013.01); *A47G 2200/186* (2013.01); *Y10T 29/49826* (2015.01)

(56) References Cited

U.S. PATENT DOCUMENTS

| | | |
|---|---|---|
| 1,338,582 A | 4/1920 | Morris et al. |
| 1,451,236 A | 4/1923 | Stanfield |
| D65,759 S | 10/1924 | Short |
| 1,541,451 A | 6/1925 | Wallace |
| 2,004,166 A | 6/1935 | Low |
| 2,201,251 A | 5/1940 | Patten |
| 2,235,281 A | 3/1941 | Carver |
| 2,292,059 A | 8/1942 | Charles |
| D163,481 S | 5/1951 | Rauh |
| 2,687,674 A | 8/1954 | Emilea |
| D208,234 S | 8/1967 | Ely |
| D209,077 S | 10/1967 | Andre |
| D213,392 S | 2/1969 | Andre |
| D216,414 S | 12/1969 | Hanson |
| 3,623,356 A | 11/1971 | Bisberg |
| 3,732,702 A | 5/1973 | Desch |
| 3,794,828 A | 2/1974 | Arpino |
| 3,949,767 A | 4/1976 | Rose |
| D243,301 S | 2/1977 | Ravr |
| D243,478 S | 2/1977 | Jones |
| D254,208 S | 2/1980 | Breslow |
| 4,278,870 A | 7/1981 | Carleton et al. |
| D261,845 S | 11/1981 | Wachtel |
| D266,028 S | 8/1982 | Boyd |
| 4,491,899 A | 1/1985 | Fleming |
| D284,483 S | 7/1986 | Yang |
| D290,662 S | 7/1987 | Basil et al. |
| D307,358 S | 4/1990 | Gerton |
| D309,833 S | 8/1990 | Wahl |
| D317,531 S | 6/1991 | Evans |
| 5,025,354 A | 6/1991 | Kondo |
| 5,164,861 A | 11/1992 | Katz |
| D335,580 S | 5/1993 | Gaullier |
| 5,267,081 A | 11/1993 | Pein |
| 5,267,786 A | 12/1993 | Aisley |
| 5,392,162 A | 2/1995 | Glucksman |
| D378,159 S | 2/1997 | Mulkey |
| D379,125 S | 5/1997 | Simjian |
| D391,773 S | 3/1998 | Zaidman et al. |
| D409,003 S | 5/1999 | Scavini |
| 5,979,976 A | 11/1999 | Ferencik |
| 5,984,485 A | 11/1999 | Poli et al. |
| 6,042,242 A | 3/2000 | Chang |
| D425,313 S | 5/2000 | Zadro |
| D426,182 S | 6/2000 | Brown |
| 6,106,121 A | 8/2000 | Buckley et al. |
| D431,375 S | 10/2000 | Zadro |
| 6,158,877 A | 12/2000 | Zadro |
| 6,206,530 B1 | 3/2001 | Eberts |
| D442,371 S | 5/2001 | Eberts |
| 6,231,992 B1 | 5/2001 | Niebauer et al. |
| 6,241,357 B1 | 6/2001 | Lee |
| 6,270,240 B1 | 8/2001 | Inoue |
| 6,273,585 B1 | 8/2001 | Wu |
| 6,305,809 B1 | 10/2001 | Zadro |
| D454,701 S | 3/2002 | Eric |
| D459,094 S | 6/2002 | Stone et al. |
| 6,420,682 B1 | 7/2002 | Sellgren et al. |
| 6,466,826 B1 | 10/2002 | Nishihira et al. |
| D465,490 S | 11/2002 | Wei |
| 6,496,107 B1 | 12/2002 | Himmelstein |
| 6,553,123 B1 | 4/2003 | Dykstra |
| D474,432 S | 5/2003 | Good |
| 6,560,027 B2 | 5/2003 | Meine |
| 6,594,630 B1 | 7/2003 | Zlokarnik et al. |
| 6,604,836 B2 | 8/2003 | Carlucci et al. |
| 6,676,272 B2 | 1/2004 | Chance |
| D486,964 S | 2/2004 | Prince et al. |
| D488,626 S | 4/2004 | Kruger |
| D492,230 S | 6/2004 | Berger |
| 6,830,154 B2 | 12/2004 | Zadro |
| 6,848,822 B2 | 2/2005 | Ballen et al. |
| D505,555 S | 5/2005 | Snell |
| 6,886,351 B2 | 5/2005 | Palfy et al. |
| D508,883 S | 8/2005 | Falconer |
| D509,369 S | 9/2005 | Snell |
| D511,413 S | 11/2005 | Yue |
| 6,961,168 B2 | 11/2005 | Agrawal et al. |
| D512,841 S | 12/2005 | Dirks |
| 7,004,599 B2 | 2/2006 | Mullani |
| 7,048,406 B1 | 5/2006 | Shih |
| 7,054,668 B2 | 5/2006 | Endo et al. |
| D524,469 S | 7/2006 | Pitot et al. |
| 7,090,378 B1 | 8/2006 | Zadro |
| D532,981 S | 12/2006 | Zadro |
| D540,549 S | 4/2007 | Yue |
| 7,233,154 B2 | 6/2007 | Groover et al. |
| D546,567 S | 7/2007 | Bhavnani |
| D547,555 S | 7/2007 | Lo et al. |
| D558,987 S | 1/2008 | Gildersleeve |
| D562,571 S | 2/2008 | Pitot |
| 7,341,356 B1 | 3/2008 | Zadro |
| 7,347,573 B1 | 3/2008 | Isler |
| 7,349,144 B2 | 3/2008 | Varaprasad et al. |
| D568,081 S | 5/2008 | Thompson et al. |
| D569,671 S | 5/2008 | Thompson et al. |
| 7,370,982 B2 | 5/2008 | Bauer et al. |
| D572,024 S | 7/2008 | Shapiro |
| 7,393,115 B2 | 7/2008 | Tokushita et al. |
| D574,159 S | 8/2008 | Howard |
| 7,417,699 B2 | 8/2008 | Yun et al. |
| 7,423,522 B2 | 9/2008 | O'brien et al. |
| 7,435,928 B2 | 10/2008 | Platz |
| 7,446,924 B2 | 11/2008 | Schofield et al. |
| 7,455,412 B2 | 11/2008 | Rottcher |
| D582,984 S | 12/2008 | Mininger et al. |
| D584,516 S | 1/2009 | Otomo |
| 7,500,755 B2 | 3/2009 | Ishizaki et al. |
| 7,513,476 B1 | 4/2009 | Huang |
| 7,551,354 B2 | 6/2009 | Horsten et al. |
| 7,570,413 B2 | 8/2009 | Tonar et al. |
| 7,589,893 B2 | 9/2009 | Rottcher |
| 7,621,651 B2 | 11/2009 | Chan et al. |
| 7,626,655 B2 | 12/2009 | Yamazaki et al. |
| 7,636,195 B2 | 12/2009 | Nieuwkerk et al. |
| 7,651,229 B1 | 1/2010 | Rimback et al. |
| 7,679,809 B2 | 3/2010 | Tonar et al. |
| 7,728,927 B2 | 6/2010 | Nieuwkerk et al. |
| 7,805,260 B2 | 9/2010 | Mischel, Jr. et al. |
| D625,930 S | 10/2010 | Merica |
| 7,813,023 B2 | 10/2010 | Baur |
| 7,813,060 B1 | 10/2010 | Bright et al. |
| 7,826,123 B2 | 11/2010 | McCabe et al. |
| 7,853,414 B2 | 12/2010 | Mischel, Jr. et al. |
| 7,855,755 B2 | 12/2010 | Weller et al. |
| 7,856,248 B1 | 12/2010 | Fujisaki |
| 7,859,737 B2 | 12/2010 | McCabe et al. |
| 7,859,738 B2 | 12/2010 | Baur et al. |
| 7,864,399 B2 | 1/2011 | McCabe et al. |
| D635,009 S | 3/2011 | Paterson |

(56) References Cited

U.S. PATENT DOCUMENTS

| | | |
|---|---|---|
| 7,898,719 B2 | 3/2011 | Schofield et al. |
| 7,903,335 B2 | 3/2011 | Nieuwkerk et al. |
| 7,916,129 B2 | 3/2011 | Lin et al. |
| 7,916,380 B2 | 3/2011 | Tonar et al. |
| 7,953,648 B2 | 5/2011 | Vock |
| D639,077 S | 6/2011 | DeBretton Gordon |
| 7,978,393 B2 | 7/2011 | Tonar et al. |
| 8,004,741 B2 | 8/2011 | Tonar et al. |
| D647,444 S | 10/2011 | Manukyan et al. |
| D649,790 S | 12/2011 | Pitot |
| 8,083,386 B2 | 12/2011 | Lynam |
| D652,220 S | 1/2012 | Pitot |
| 8,099,247 B2 | 1/2012 | Mischel, Jr. et al. |
| D656,979 S | 4/2012 | Yip et al. |
| D657,425 S | 4/2012 | Podd |
| D657,576 S | 4/2012 | Pitot |
| 8,154,418 B2 | 4/2012 | Peterson et al. |
| 8,162,502 B1 | 4/2012 | Zadro |
| D658,604 S | 5/2012 | Egawa et al. |
| D660,367 S | 5/2012 | Podd |
| D660,368 S | 5/2012 | Podd |
| D660,369 S | 5/2012 | Podd |
| 8,179,236 B2 | 5/2012 | Weller et al. |
| 8,179,586 B2 | 5/2012 | Schofield et al. |
| 8,194,133 B2 | 6/2012 | DeWind et al. |
| 8,228,588 B2 | 7/2012 | McCabe et al. |
| D665,030 S | 8/2012 | Podd |
| D666,010 S | 8/2012 | Farley |
| D670,087 S | 11/2012 | Walker |
| 8,335,032 B2 | 12/2012 | McCabe et al. |
| 8,348,441 B1 | 1/2013 | Skelton |
| 8,356,908 B1 | 1/2013 | Zadro |
| 8,379,289 B2 | 2/2013 | Schofield et al. |
| 8,382,189 B2 | 2/2013 | Li et al. |
| 8,393,749 B1 | 3/2013 | Daicos |
| 8,400,704 B2 | 3/2013 | McCabe et al. |
| D679,101 S | 4/2013 | Pitot |
| D679,102 S | 4/2013 | Gilboe et al. |
| D680,755 S | 4/2013 | Gilboe et al. |
| 8,503,062 B2 | 8/2013 | Baur et al. |
| 8,506,096 B2 | 8/2013 | McCabe et al. |
| 8,508,832 B2 | 8/2013 | Baumann et al. |
| 8,511,841 B2 | 8/2013 | Varaprasad et al. |
| D688,883 S | 9/2013 | Gilboe et al. |
| D689,701 S | 9/2013 | Mischel, Jr. et al. |
| 8,559,092 B2 | 10/2013 | Bugno et al. |
| 8,559,093 B2 | 10/2013 | Varaprasad et al. |
| 8,585,273 B2 | 11/2013 | Pokrovskiy et al. |
| D699,448 S | 2/2014 | Yang et al. |
| D699,952 S | 2/2014 | Yang et al. |
| 8,649,082 B2 | 2/2014 | Baur |
| D701,050 S | 3/2014 | Yang et al. |
| D701,507 S | 3/2014 | Cope |
| 8,705,161 B2 | 4/2014 | Schofield et al. |
| 8,727,547 B2 | 5/2014 | McCabe et al. |
| D707,454 S | 6/2014 | Pitot |
| 8,743,051 B1 | 6/2014 | Moy et al. |
| D711,871 S | 8/2014 | Daniel |
| D711,874 S | 8/2014 | Cope |
| 8,797,627 B2 | 8/2014 | McCabe et al. |
| D712,963 S | 9/2014 | Fleet |
| 8,880,360 B2 | 11/2014 | Mischel, Jr. et al. |
| 8,910,402 B2 | 12/2014 | Mischel, Jr. et al. |
| D727,630 S | 4/2015 | Zadro |
| D729,525 S | 5/2015 | Tsai |
| D729,527 S | 5/2015 | Tsai |
| D730,065 S | 5/2015 | Tsai |
| 9,090,211 B2 | 7/2015 | McCabe et al. |
| D736,001 S | 8/2015 | Yang et al. |
| D737,059 S | 8/2015 | Tsai |
| D737,060 S | 8/2015 | Yang et al. |
| 9,105,202 B2 | 8/2015 | Mischel, Jr. et al. |
| D737,580 S | 9/2015 | Tsai |
| D738,118 S | 9/2015 | Gyanendra et al. |
| 9,170,353 B2 | 10/2015 | Chang |
| 9,173,509 B2 | 11/2015 | Mischel, Jr. et al. |
| 9,174,578 B2 | 11/2015 | Uken et al. |
| 9,205,780 B2 | 12/2015 | Habibi et al. |
| 9,232,846 B2 | 1/2016 | Fung |
| 9,254,789 B2 | 2/2016 | Anderson et al. |
| D751,829 S | 3/2016 | Yang et al. |
| D754,446 S | 4/2016 | Yang et al. |
| 9,327,649 B2 | 5/2016 | Habibi |
| 9,341,914 B2 | 5/2016 | McCabe et al. |
| 9,347,660 B1 | 5/2016 | Zadro |
| D764,592 S | 8/2016 | Zenoff |
| 9,499,103 B2 | 11/2016 | Han |
| 9,510,711 B2 | 12/2016 | Tsibulevskiy et al. |
| 9,528,695 B2 | 12/2016 | Adachi et al. |
| D776,945 S | 1/2017 | Yang |
| D779,836 S | 2/2017 | Bailey |
| D785,345 S | 5/2017 | Yang et al. |
| 9,638,410 B2 | 5/2017 | Yang et al. |
| 9,694,751 B2 | 7/2017 | Lundy, Jr. et al. |
| 9,709,869 B2 | 7/2017 | Baumann et al. |
| D793,099 S | 8/2017 | Bailey |
| D801,060 S | 10/2017 | Hollinger |
| 9,827,912 B2 | 11/2017 | Olesen et al. |
| 9,845,537 B2 | 12/2017 | Mischel, Jr. et al. |
| 9,878,670 B2 | 1/2018 | McCabe et al. |
| 9,897,306 B2 | 2/2018 | Yang et al. |
| 9,921,390 B1 | 3/2018 | Mischel, Jr. et al. |
| 9,933,595 B1 | 4/2018 | Mischel, Jr. et al. |
| D816,350 S | 5/2018 | Yang et al. |
| 10,016,045 B1 | 7/2018 | Hollinger |
| 10,023,123 B2 | 7/2018 | Takada et al. |
| 10,029,616 B2 | 7/2018 | McCabe et al. |
| 10,035,461 B2 | 7/2018 | Lin et al. |
| D825,940 S | 8/2018 | Liu |
| 10,076,176 B2 | 9/2018 | Yang et al. |
| D830,706 S | 10/2018 | Pitot |
| 10,161,622 B1 | 12/2018 | Frazier |
| D840,699 S | 2/2019 | Xie |
| D845,652 S | 4/2019 | Yang et al. |
| D846,288 S | 4/2019 | Yang et al. |
| D848,158 S | 5/2019 | Yang et al. |
| D850,125 S | 6/2019 | Wang et al. |
| D854,838 S | 7/2019 | Jeon et al. |
| D869,863 S | 12/2019 | Liu |
| D871,084 S | 12/2019 | Pestl et al. |
| 10,524,591 B2 | 1/2020 | Kim |
| D874,161 S | 2/2020 | Yang et al. |
| D874,162 S | 2/2020 | Greenwalt |
| D878,776 S | 3/2020 | Liu |
| D879,481 S | 3/2020 | Yang |
| D879,482 S | 3/2020 | Yang |
| D882,280 S | 4/2020 | Yang |
| 10,652,447 B1 | 5/2020 | Pestl et al. |
| D885,769 S | 6/2020 | Wang |
| D891,121 S | 7/2020 | Zhao et al. |
| D891,123 S | 7/2020 | Li et al. |
| D891,125 S | 7/2020 | Liu |
| 10,702,043 B2 | 7/2020 | Yang et al. |
| D891,792 S | 8/2020 | Yang |
| D892,508 S | 8/2020 | Yang |
| D893,892 S | 8/2020 | Rajasekaran et al. |
| 10,746,394 B2 | 8/2020 | Yang et al. |
| D894,615 S | 9/2020 | Yang |
| D895,305 S | 9/2020 | Yang |
| D897,694 S | 10/2020 | Lin |
| D897,695 S | 10/2020 | Yang |
| D898,383 S | 10/2020 | Zhou |
| D898,386 S | 10/2020 | Huang |
| D898,387 S | 10/2020 | Yang |
| D901,908 S | 11/2020 | Zhao et al. |
| 10,869,537 B2 | 12/2020 | Yang et al. |
| D909,770 S | 2/2021 | Li et al. |
| D918,602 S | 5/2021 | Chen |
| D919,981 S | 5/2021 | Li |
| D919,983 S | 5/2021 | Yang |
| D919,984 S | 5/2021 | Yang |
| 11,013,307 B2 | 5/2021 | Yang et al. |
| 11,026,497 B2 | 6/2021 | Yang et al. |
| D924,456 S | 7/2021 | Zhao et al. |

(56) References Cited

U.S. PATENT DOCUMENTS

| | | |
|---|---|---|
| D925,928 S | 7/2021 | Yang et al. |
| D927,863 S | 8/2021 | Yang et al. |
| D932,198 S | 10/2021 | Sze |
| D932,781 S | 10/2021 | Liu |
| D933,374 S | 10/2021 | Luo |
| D935,791 S | 11/2021 | Li et al. |
| D938,170 S | 12/2021 | Liu |
| D939,842 S | 1/2022 | Li et al. |
| D939,843 S | 1/2022 | Li et al. |
| D942,159 S | 2/2022 | Yang |
| D949,579 S | 4/2022 | Chen |
| 11,371,692 B2 | 6/2022 | Yang et al. |
| 11,566,784 B2 | 1/2023 | Yang et al. |
| 2002/0196333 A1* | 12/2002 | Gorischek ............... H04N 7/18 386/314 |
| 2003/0030063 A1 | 2/2003 | Sosniak et al. |
| 2003/0031010 A1 | 2/2003 | Sosniak et al. |
| 2003/0065515 A1 | 4/2003 | Yokota |
| 2003/0133292 A1 | 7/2003 | Mueller et al. |
| 2003/0223250 A1 | 12/2003 | Ballen et al. |
| 2004/0020509 A1 | 2/2004 | Waisman |
| 2004/0027695 A1 | 2/2004 | Lin |
| 2004/0125592 A1 | 7/2004 | Nagakubo et al. |
| 2004/0156133 A1 | 8/2004 | Vernon |
| 2004/0173498 A1 | 9/2004 | Lee |
| 2005/0036300 A1 | 2/2005 | Dowling et al. |
| 2005/0068646 A1* | 3/2005 | Lev ........................ A45D 42/24 359/432 |
| 2005/0146863 A1 | 7/2005 | Mullani |
| 2005/0156753 A1 | 7/2005 | Deline et al. |
| 2005/0243556 A1 | 11/2005 | Lynch |
| 2005/0270769 A1 | 12/2005 | Smith |
| 2005/0276053 A1 | 12/2005 | Nortrup et al. |
| 2006/0077654 A1 | 4/2006 | Krieger et al. |
| 2006/0132923 A1 | 6/2006 | Hsiao et al. |
| 2006/0164725 A1 | 7/2006 | Horsten et al. |
| 2006/0184993 A1 | 8/2006 | Goldthwaite et al. |
| 2006/0186314 A1 | 8/2006 | Leung |
| 2007/0050211 A1 | 3/2007 | Mandl |
| 2007/0097672 A1 | 5/2007 | Benn |
| 2007/0146616 A1 | 6/2007 | Nouchi et al. |
| 2007/0159846 A1 | 7/2007 | Nishiyama et al. |
| 2007/0183037 A1 | 8/2007 | De Boer et al. |
| 2007/0263999 A1 | 11/2007 | Keam |
| 2007/0297189 A1 | 12/2007 | Wu et al. |
| 2008/0078796 A1 | 4/2008 | Parsons |
| 2008/0088244 A1 | 4/2008 | Morishita |
| 2008/0118080 A1 | 5/2008 | Gratke et al. |
| 2008/0130305 A1 | 6/2008 | Wang et al. |
| 2008/0244940 A1 | 10/2008 | Mesika |
| 2008/0258110 A1 | 10/2008 | Oshio |
| 2008/0265799 A1 | 10/2008 | Sibert |
| 2008/0271354 A1 | 11/2008 | Bostrom |
| 2008/0294012 A1 | 11/2008 | Kurtz et al. |
| 2008/0297586 A1 | 12/2008 | Kurtz et al. |
| 2008/0298080 A1 | 12/2008 | Wu et al. |
| 2009/0027902 A1 | 1/2009 | Fielding et al. |
| 2009/0194670 A1 | 8/2009 | Rains, Jr. et al. |
| 2009/0207339 A1 | 8/2009 | Ajichi et al. |
| 2009/0213604 A1 | 8/2009 | Uken |
| 2009/0244740 A1 | 10/2009 | Takayanagi et al. |
| 2009/0301927 A1 | 12/2009 | Fylbrook et al. |
| 2010/0033988 A1 | 2/2010 | Chiu et al. |
| 2010/0118422 A1 | 5/2010 | Holacka |
| 2010/0118520 A1 | 5/2010 | Stern et al. |
| 2010/0296298 A1 | 11/2010 | Martin, Jr. |
| 2010/0309159 A1 | 12/2010 | Roettcher |
| 2011/0058269 A1 | 3/2011 | Su |
| 2011/0074225 A1 | 3/2011 | Delnoij et al. |
| 2011/0080374 A1 | 4/2011 | Feng et al. |
| 2011/0194200 A1 | 8/2011 | Greenlee |
| 2011/0211079 A1 | 9/2011 | Rolston |
| 2011/0273659 A1 | 11/2011 | Sobecki |
| 2011/0283577 A1 | 11/2011 | Cornelissen et al. |
| 2012/0056738 A1 | 3/2012 | Lynam |
| 2012/0080903 A1 | 4/2012 | Li et al. |
| 2012/0081915 A1 | 4/2012 | Foote et al. |
| 2012/0229789 A1 | 9/2012 | Kang et al. |
| 2012/0307490 A1 | 12/2012 | Ellis |
| 2013/0026512 A1 | 1/2013 | Tsai |
| 2013/0077292 A1 | 3/2013 | Zimmerman |
| 2013/0120989 A1 | 5/2013 | Sun et al. |
| 2013/0190845 A1 | 7/2013 | Liu et al. |
| 2013/0235607 A1 | 9/2013 | Yang et al. |
| 2013/0235610 A1 | 9/2013 | Yang et al. |
| 2014/0240964 A1 | 8/2014 | Adachi et al. |
| 2015/0060431 A1 | 3/2015 | Yang et al. |
| 2015/0203970 A1 | 7/2015 | Mischel, Jr. et al. |
| 2015/0205110 A1 | 7/2015 | Mischel, Jr. et al. |
| 2015/0305113 A1 | 10/2015 | Ellis |
| 2016/0045015 A1 | 2/2016 | Baldwin |
| 2016/0070085 A1 | 3/2016 | Mischel, Jr. et al. |
| 2016/0082890 A1 | 3/2016 | Habibi et al. |
| 2016/0178964 A1 | 6/2016 | Sakai et al. |
| 2016/0193902 A1 | 7/2016 | Hill et al. |
| 2016/0200256 A1 | 7/2016 | Takada et al. |
| 2016/0243989 A1 | 8/2016 | Habibi |
| 2016/0255941 A1 | 9/2016 | Yang et al. |
| 2017/0028924 A1 | 2/2017 | Baur et al. |
| 2017/0139302 A1 | 5/2017 | Tonar |
| 2017/0158139 A1 | 6/2017 | Tonar et al. |
| 2017/0164719 A1 | 6/2017 | Wheeler |
| 2017/0190290 A1 | 7/2017 | Lin et al. |
| 2017/0257543 A1 | 9/2017 | Rowles et al. |
| 2017/0285392 A1 | 10/2017 | Hirata et al. |
| 2017/0297495 A1 | 10/2017 | Lundy, Jr. et al. |
| 2017/0297498 A1 | 10/2017 | Larson et al. |
| 2017/0313251 A1 | 11/2017 | Uken et al. |
| 2017/0349102 A1 | 12/2017 | Habibi |
| 2018/0012526 A1 | 1/2018 | Dunn et al. |
| 2018/0015880 A1 | 1/2018 | Olesen et al. |
| 2018/0017823 A1 | 1/2018 | Saenger Nayver et al. |
| 2018/0032227 A1 | 2/2018 | Broxson |
| 2018/0050641 A1 | 2/2018 | Lin et al. |
| 2018/0105114 A1 | 4/2018 | Geerlings et al. |
| 2018/0147993 A1 | 5/2018 | McCabe et al. |
| 2018/0162269 A1* | 6/2018 | Bredeweg ............ G02B 6/0036 |
| 2018/0251069 A1 | 9/2018 | LaCross et al. |
| 2018/0263362 A1 | 9/2018 | Yang et al. |
| 2018/0268747 A1 | 9/2018 | Braun |
| 2018/0270410 A1* | 9/2018 | Lyle ........................ H04N 23/51 |
| 2018/0343418 A1 | 11/2018 | Van Ness |
| 2019/0000219 A1 | 1/2019 | Yang et al. |
| 2019/0003699 A1 | 1/2019 | Mondora |
| 2019/0054863 A1 | 2/2019 | Roth |
| 2019/0246772 A1 | 8/2019 | Yang et al. |
| 2019/0291647 A1 | 9/2019 | Yang et al. |
| 2019/0328161 A1* | 10/2019 | Wei ........................ A47G 1/02 |
| 2019/0351830 A1* | 11/2019 | Bosma ................ B60Q 1/2665 |
| 2020/0008592 A1* | 1/2020 | Meyers ..................... G06F 3/02 |
| 2020/0085170 A1 | 3/2020 | Yang et al. |
| 2020/0278514 A1 | 9/2020 | Yang et al. |
| 2020/0333934 A1* | 10/2020 | Pestl ....................... G03B 15/02 |
| 2021/0137266 A1 | 5/2021 | Pestl et al. |
| 2021/0196028 A1 | 7/2021 | Yang et al. |
| 2021/0307491 A1 | 10/2021 | Yang et al. |
| 2021/0364892 A1 | 11/2021 | Copeland et al. |

FOREIGN PATENT DOCUMENTS

| | | |
|---|---|---|
| AU | 365512 | 12/2015 |
| CA | 147356 | 4/2013 |
| CA | 152609 | 5/2014 |
| CA | 157803 | 4/2016 |
| CA | 158686 | 4/2016 |
| CA | 164267 | 6/2016 |
| CA | 177018 | 12/2018 |
| CA | 2807615 | 6/2020 |
| CN | 3044427D | 5/1996 |
| CN | 2379638 Y | 5/2000 |
| CN | 3357935D | 3/2004 |
| CN | 2852806 Y | 1/2007 |
| CN | 2925206 Y | 7/2007 |
| CN | 300746709 D | 2/2008 |

(56) References Cited

FOREIGN PATENT DOCUMENTS

| | | |
|---|---|---|
| CN | 101160003 A | 4/2008 |
| CN | 101382025 A | 3/2009 |
| CN | 300973066 S | 8/2009 |
| CN | 300983799 S | 8/2009 |
| CN | 300990023 S | 8/2009 |
| CN | 301001894 S | 9/2009 |
| CN | 201388790 Y | 1/2010 |
| CN | 301108997 S | 1/2010 |
| CN | 301209880 S | 5/2010 |
| CN | 101787830 A | 7/2010 |
| CN | 301278203 S | 7/2010 |
| CN | 301340032 S | 9/2010 |
| CN | 301502988 S | 4/2011 |
| CN | 102057756 A | 5/2011 |
| CN | 301583101 S | 6/2011 |
| CN | 301811715 S | 1/2012 |
| CN | 302103915 S | 10/2012 |
| CN | 302140631 S | 10/2012 |
| CN | 302140632 S | 10/2012 |
| CN | 302337970 S | 3/2013 |
| CN | 302363850 S | 3/2013 |
| CN | 302396166 S | 4/2013 |
| CN | 302442518 S | 5/2013 |
| CN | 302638575 S | 11/2013 |
| CN | 302668773 S | 12/2013 |
| CN | 106377049 A | 2/2017 |
| CN | 108185741 | 6/2018 |
| CN | 207626762 U | 7/2018 |
| CN | 211577476 U | 9/2020 |
| CN | 211600392 U | 9/2020 |
| CN | 111759073 A | 10/2020 |
| CN | 306124222 | 10/2020 |
| DE | 2924529 A1 | 1/1981 |
| DE | 29904039 U1 | 6/1999 |
| DE | 20014279 U1 | 2/2001 |
| DE | 102004042929 A1 | 3/2006 |
| DE | 202007013393 U1 | 12/2007 |
| DE | 102006060781 A1 | 4/2008 |
| DE | 202009004795 U1 | 9/2009 |
| DE | 202010000170 U1 | 7/2010 |
| DE | 202012103555 U1 | 2/2014 |
| EP | 1792553 A2 | 6/2007 |
| FR | 2 788 951 | 8/2000 |
| GB | 2346206 A | 8/2000 |
| GB | 2363712 | 1/2002 |
| GB | 6018574 | 11/2017 |
| JP | S49-131097 | 11/1974 |
| JP | 55-129073 | 10/1980 |
| JP | 59-166769 | 11/1984 |
| JP | 3057292 | 12/1998 |
| JP | 2003-79495 | 3/2003 |
| JP | 2004-290531 A | 10/2004 |
| JP | 2006-202602 | 8/2006 |
| JP | 2008-073174 A | 4/2008 |
| JP | 2013-172802 | 9/2013 |
| JP | 2014-212075 | 11/2014 |
| KR | 30-0318286 | 2/2003 |
| KR | 2003-0017261 A | 3/2003 |
| KR | 30-0330692 | 8/2003 |
| KR | 200400903 Y1 | 11/2005 |
| KR | 30-0507873 | 10/2008 |
| KR | 30-0586341 | 1/2011 |
| KR | 30-0692452 | 5/2013 |
| KR | 30-0712086 | 10/2013 |
| WO | WO 2004/074886 A1 | 9/2004 |
| WO | WO 2018/045649 A1 | 3/2018 |

OTHER PUBLICATIONS

U.S. Appl. No. 29/723,452, filed Feb. 6, 2020, Yang et al.
Ilumay M-97 Led Smart Sensor Mirror, available from internet https://www.alibaba.com/product-detail/ilumay-M-97-led-smart-sensor_60701769220.html, availablility as early as Dec. 16, 2017.
Advanced Lighting Guidelines, 1993 (second edition), Chapter entitled, "Occupant Sensors", Published by California Energy Commission (CEC Pub.), in 14 pages.
Jerdon, Model JRT910CL 5X Magnified Lighted Tabletop Rectangular Mirror, Chrome Finish, 67.2 Ounce, https://www.amazon.com/Jerdon-JRT910CL-Magnified-Tabletop-Rectangular/dp/B00N1WE3UC?th=1, Jun. 2015, in 8 pages.
Kore, "Building an intelligent voice controlled mirror," retrieved from the internet on Jul. 11, 2019: https://medium.com/@akshaykore/building-an-intelligent-voice-controlled-mirror-2edbc7d62c9e, Jun. 26, 2017, in 10 pages.
Pinterest, Plug-in wall-mount makeup mirror has adjustment handle, https://www.pinterest.com/pin/856035841641838288/?d=t&mt=login, viewed on Feb. 1, 2022, in 3 pages.
Sharper Image, Model JRT718CL Product Specification, Slimline Series LED Lighted Wall Mount Mirror, copyright 2015, https://www.ameraproducts.com/Shard/ProductLitirature/Jerdon/JRT718CL-amera.pdf, in 1 pages.
Sharper Image, Model JRT950NL, Slimline LED Lighted Tabletop 8X Magnification Mirror,|https://www.amazon.com/Sharper-Imange-JRT950NL-Slimline-Magnification/dp/B015W76T3M?th=1, Jan. 20, 2016, in 8 pages.
Simple Human Vanity Mirror, available from internet at http://www.bedbathandbeyond.com/store/products/ simplehuman-reg-5x-sensor-vanity-mirror/1041483503?categoryId=12028, apparently available Dec. 19, 2013, site visited Dec. 2, 2014.
Simple Human Sensor Mirror, Internet Archive Wayback Machine webpage capture of|http://www.tuvie.com/stainless-steel-sensor-mirror-by-simplehuman/, apparently available Jan. 27, 2013, site visited Dec. 2, 2014.
Simplehuman Mini Sensor Mirror, available from internet at http://www.amazon.com/gp/product/B00FZ3MFAA/ref=pd_lpo_sbs_dp_ss_3?pf_rd_p=1944579862&pf_rd_s=lpo-top-stripe-1&pf_rd_t=201&pf_rd_i=B00M8MC5H4&pf_rd_m=ATBPDKIKX0DER&pf_rd_r=0RHFJEABM9QKSWJKK99N#Ask, apparently available Mar. 11, 2014, site visited Jan. 8, 2015.
Simplehuman Sensor Mirror, available from internet at http://www.amazon.com/simplehuman-Sensor-Sensor-Activated-Lighted-Magnification/dp/B00M8MC5H4#customerReviews, apparently available Dec. 31, 2014, site visited Jan. 8, 2015.
Simplehuman Wall Mount Mirror, available from internet at http://www.amazon.com/simplehuman-Wall-Mount-Sensor-Mirror/dp/B00FN92ELG#customerReviews, available at least as early as Jan. 31, 2013, site visited Jan. 8, 2015.
Simplehuman Wide View Sensor Mirror, available from internet athttp://www.amazon.com/simplehuman-Wide-View-Sensor-Mirror/dp/B01C2RXD7K, site visited Aug. 9, 2016.
Simplehuman Sensor Mirror Pro Wide-View, available from internet at http://www.simplehuman.com/wide-view-sensor-mirror, site visited Aug. 9, 2016.
Brookstone Shower Mirror, available from internet at http://www.brookstone.com/9-Lighted-Fogless-Shower-Mirror?bkiid=?SubCategory_Bath_Spa_Mirrors_Lighting_Makeup_Mirrors%7CSubCategoryWidget%7C608364p&catld=n/, apparently available Jan. 15, 2013, site visited Dec. 2, 2014.
Jerdon Wall Mounted Mirror, available from internet at http://www.amazon.com/Jerdon-HL1016NL-9-5-Inch-Lighted-Magnification/dp/B00413G9K2/ref=sr_1_26?ie=UTF8&qid=1420579897&sr=8-26&keywords=wall+mounted+mirror#customerReviews, apparently available Feb. 21, 2009, site visited Jan. 8, 2015.
Jerdon Wall Mounted Mirror, available from internet at http://www.amazon.com/Jerdon-JD7C-9-Inch-Lighted-Magnification/dp/B001DKVC08/ref=sr_1_54?ie=UTF8&qid=1420580127&sr=8-54&keywords=wall+mounted+mirror, apparently available Oct. 6, 2010, site visited Jan. 8, 2015.
Zadro Z'fogless Mirror with Light, available from internet at http://www.amazon.com/Zadro-1X-Zfogless-Adjustable-Magnification/dp/B000ARWLIW/ref=sr_1_16?s=beauty&ie=UTF8&qid=1439229012&sr=1-16&keywords=zadro+lighted+fogless+mirror, apparently available Nov. 27, 2006, site visited Aug. 10, 2015.

* cited by examiner

VANITY MIRROR

CROSS-REFERENCE TO RELATED APPLICATIONS

This present application is a continuation of U.S. patent application Ser. No. 17/664,781, filed on May 24, 2022 which is a continuation of U.S. patent application Ser. No. 16/923,994, filed on Jul. 8, 2020, now U.S. Pat. No. 11,371,692, which is a continuation of U.S. patent application Ser. No. 15/863,586, filed Jan. 5, 2018, now U.S. Pat. No. 10,746,394, entitled "VANITY MIRROR", which is a continuation of U.S. patent application Ser. No. 13/783,109, filed Mar. 1, 2013, now U.S. Pat. No. 9,897,306, entitled "VANITY MIRROR" which claims priority benefit under 35 U.S.C. § 119(e) to U.S. Provisional Application No. 61/608,584, filed Mar. 8, 2012, entitled "VANITY MIRROR ASSEMBLY," which is hereby incorporated by reference in its entirety.

BACKGROUND

Field

The present disclosure relates to reflective devices, such as mirrors.

Description of the Related Art

Vanity mirrors are mirrors that are typically used for reflecting an image of a user during personal grooming, primping, cosmetic care, or the like. Vanity mirrors are available in different configurations, such as free-standing mirrors, hand-held mirrors, mirrors connected to vanity tables, bathroom wall mirrors, car mirrors, and/or mirrors attached to or produced by electronic screens or devices.

Many vanity mirrors distort the reflected image because of, for example, poor quality reflective surfaces, harsh light sources, and/or uneven distribution of light. Additionally, the light sources of conventional vanity mirrors are typically energy inefficient. Further, the light sources of conventional vanity mirrors are not adjustable or are difficult to effectively adjust.

SUMMARY

In some embodiments, a mirror assembly comprises a base, a reflective face connected with the base, a sensor (e.g., a proximity sensor or a reflective type sensor), an electronic processor, and a light source. In some implementations, the sensor is configured to detect, and generate a signal indicative of, the distance between an object and the sensor. The electronic processor can be configured to receive the signal from the sensor and can control the light source, for example, by varying the quantity or quality of light emitted by the light source depending on the detected distance between the object and the sensor.

In some embodiments, a mirror assembly comprises a base, a reflection face, one or more light sources, and a light-conveying pathway such as a light pipe. In combination, the light sources and light pipe reflect substantially constant light along a length of the light pipe. For example, in certain embodiments, the light conveying pathway is generally disposed around some, substantially all, or all of a periphery of the reflection face.

Certain aspects of this disclosure are directed toward a mirror assembly. The mirror assembly can include a mirror coupled with the housing portion, and a light source disposed at a periphery of the mirror. The mirror assembly can include a light path, such as a light pipe, having a length and positioned around at least a portion of the periphery of the mirror. The mirror assembly can include a light scattering region, such as a plurality of light scattering elements disposed along the length of the light pipe. The light scattering elements can have a pattern density that varies depending, at least in part, on the distance along the light path from the light source. The light scattering elements can be configured to encourage a portion of the light impacting the light scattering elements to be emitted out of the light path along a desired portion of the length of the light path. The amount of light scattering elements on the light path can vary depending, at least in part, on the distance along the light path from the light source. In certain embodiments, the pattern density can be less dense in a region generally adjacent the light source and more dense in a region spaced away from, or generally opposite from, the light source along the periphery of the mirror, thereby scattering the light to a greater degree as the intensity of the light diminishes further from the light source, and facilitating a substantially constant amount of light emitted along the length of the light pipe.

Any of the vanity mirror features, structures, steps, or processes disclosed in this specification can be included in any embodiment. The light scattering elements in the region generally adjacent the light source can be smaller compared to the light scattering elements in the region spaced from, or generally opposite from, or generally furthest from, the light source. The light source can be positioned near an upper portion of the mirror. The light pipe can be disposed along substantially all of the periphery of the mirror. The light source can emit light in a direction generally orthogonal to a standard viewing direction of the mirror. The light pipe can be generally circular and can include a first end and a second end. The light source can emit light into the first end, and another light source can emit light into the second end. In some embodiments, the light scattering elements can be generally uniformly distributed along at least a portion of the light pipe.

Certain aspects of this disclosure are directed toward a mirror assembly including a mirror coupled with a housing portion and one or more light sources disposed at a periphery of the mirror. The one or more light sources can be configured to emit light in a direction generally orthogonal to a primary viewing direction of the mirror. The light pipe can have a length and can be disposed along substantially all of the periphery of the mirror. The light pipe can be configured to receive light from the one or more light sources and distribute the light generally consistently along the length, thereby providing a generally constant level of illumination to the periphery of the mirror.

Any of the vanity mirror features, structures, steps, or processes disclosed in this specification can be included in any embodiment. The one or more light sources can include a first light source configured to project light in a first direction around the periphery of the mirror and a second light source configured to project light in a second direction around the periphery of the mirror. The one or more light sources can be two light sources. Each of the light sources can use less than or equal to about three watts of power. The one or more light sources can have a color rendering index of at least about 90. The one or more light sources can include light emitting diodes. The light pipe can be configured to transmit at least about 95% of the light emitted from the one or more light sources.

Certain aspects of this disclosure are directed toward methods of manufacturing a mirror assembly, such as any of the mirror assemblies disclosed in this specification. The methods can include coupling a mirror and a housing portion. The method can include disposing a light source at a periphery of the mirror. The method can include positioning a light pipe around at least a portion of the periphery of the mirror. The method can include disposing a plurality of light scattering elements along the length of a light pipe. In certain embodiments, the plurality of light scattering elements can have a pattern density. The light scattering elements can be configured to encourage a portion of the light impacting the light scattering elements to be emitted out of the light pipe. The pattern density can be less dense in a region generally adjacent the light source, and the pattern density can be more dense in a region generally opposite from, spaced from, or furthest from, the light source along the periphery of the mirror, thereby facilitating a substantially constant amount of light emitted along the length of the light pipe. In certain embodiments, the method can include positioning the light source near an upper portion of the mirror. In certain embodiments, the method can include disposing the light pipe around substantially all of the periphery of the mirror. In certain embodiments, the method can include positioning the light source to emit light in a direction generally orthogonal to a main viewing direction of the mirror. In certain embodiments, the method can include positioning the light source to emit light into a first end of the light pipe and positioning another light source to emit light into a second end of the light pipe. In certain embodiments, the method can include disposing the light scattering elements in a generally uniform pattern along at least a portion of the light pipe.

Certain aspects of this disclosure are directed toward a mirror assembly having a housing portion, a mirror, one or more light sources, a proximity sensor, and an electronic processor. The mirror can be coupled with the housing portion. The one or more light sources can be disposed at a periphery of the mirror. The proximity sensor can be configured to detect an object within a sensing region. The proximity sensor can be configured to generate a signal indicative of a distance between the object and the proximity sensor. The electronic processor can be configured to generate an electronic signal to the one or more light sources for emitting a level of light that varies depending on the distance between the object and the sensor.

Any of the vanity mirror features, structures, steps, or processes disclosed in this specification can be included in any embodiment. The proximity sensor can be positioned generally near a top region of the mirror. The electronic processor can be configured to generate an electronic signal to the one or more light sources to deactivate if the proximity sensor does not detect the presence and/or movement of the object for a predetermined period of time. The proximity sensor can be configured to have increased sensitivity after the proximity sensor detects the object (e.g., by increasing the trigger zone distance, by increasing the sensitivity to movement within a trigger zone, and/or by increasing the time period until deactivation). The mirror assembly can include an ambient light sensor configured to detect a level of ambient light. In some embodiments, the sensing region can extend from about 0 degrees to about 45 degrees downward relative to an axis extending from the proximity sensor. The proximity sensor can be mounted at an angle relative to a viewing surface of the mirror. The mirror assembly can include a lens cover positioned near the proximity sensor. In certain embodiments, a front surface of the lens cover can be positioned at an angle relative to the proximity sensor. The mirror assembly can include a light pipe having a length and being disposed along substantially all of the periphery of the mirror. The light pipe can be configured to receive light from the one or more light sources and distribute the light generally consistently along the length, thereby providing a substantially constant level of illumination to the periphery of the mirror.

Certain aspects of this disclosure are directed toward a method of manufacturing a mirror assembly. The method can include coupling a mirror with a housing portion. The method can include disposing one or more light sources at a periphery of the mirror. The method can include configuring a proximity sensor to generate a signal indicative of a distance between an object and the proximity sensor. The method can include configuring an electronic processor to generate an electronic signal to the one or more light sources for emitting a level of light that varies depending on the distance between the object and the sensor.

Any of the vanity mirror features, structures, steps, or processes disclosed in this specification can be included in any embodiment. The method of manufacturing the mirror assembly can include positioning the proximity sensor generally near a top region of the mirror. The method can include configuring the electronic processor to generate an electronic signal to the one or more light sources to deactivate if the proximity sensor does not detect the object for a period of time. The method can include configuring the proximity sensor to have increased sensitivity after the proximity sensor detects the object. The method can include configuring an ambient light sensor to detect a level of ambient light. The method can include configuring the proximity sensor to detect an object within a sensing region extending from about 0 degrees to about 45 degrees downward relative to an axis extending from the proximity sensor. The method can include mounting the proximity sensor at an angle relative to a viewing surface of the mirror. The method can include positioning a lens cover near the proximity sensor. In certain embodiments, the method can include positioning a front surface of the lens cover at an angle relative to the proximity sensor. The method can include disposing a light pipe along substantially all of the periphery of the mirror. The light pipe can be configured to receive light from the one or more light sources and distribute the light generally consistently along the length, thereby providing a substantially constant level of illumination to the periphery of the mirror.

For purposes of summarizing the disclosure, certain aspects, advantages and features of the inventions have been described herein. It is to be understood that not necessarily any or all such advantages are achieved in accordance with any particular embodiment of the inventions disclosed herein. No aspects of this disclosure are essential or indispensable.

BRIEF DESCRIPTION OF THE DRAWINGS

The above-mentioned and other features of the mirror assembly disclosed herein are described below with reference to the drawings of certain embodiments. The illustrated embodiments are intended to illustrate, but not to limit the present disclosure. The drawings contain the following Figures:

FIGS. 11A-11B illustrate enlarged views of portions of the light conveying pathway shown in FIG. 11.

DETAILED DESCRIPTION OF CERTAIN EMBODIMENTS

Figure 1:
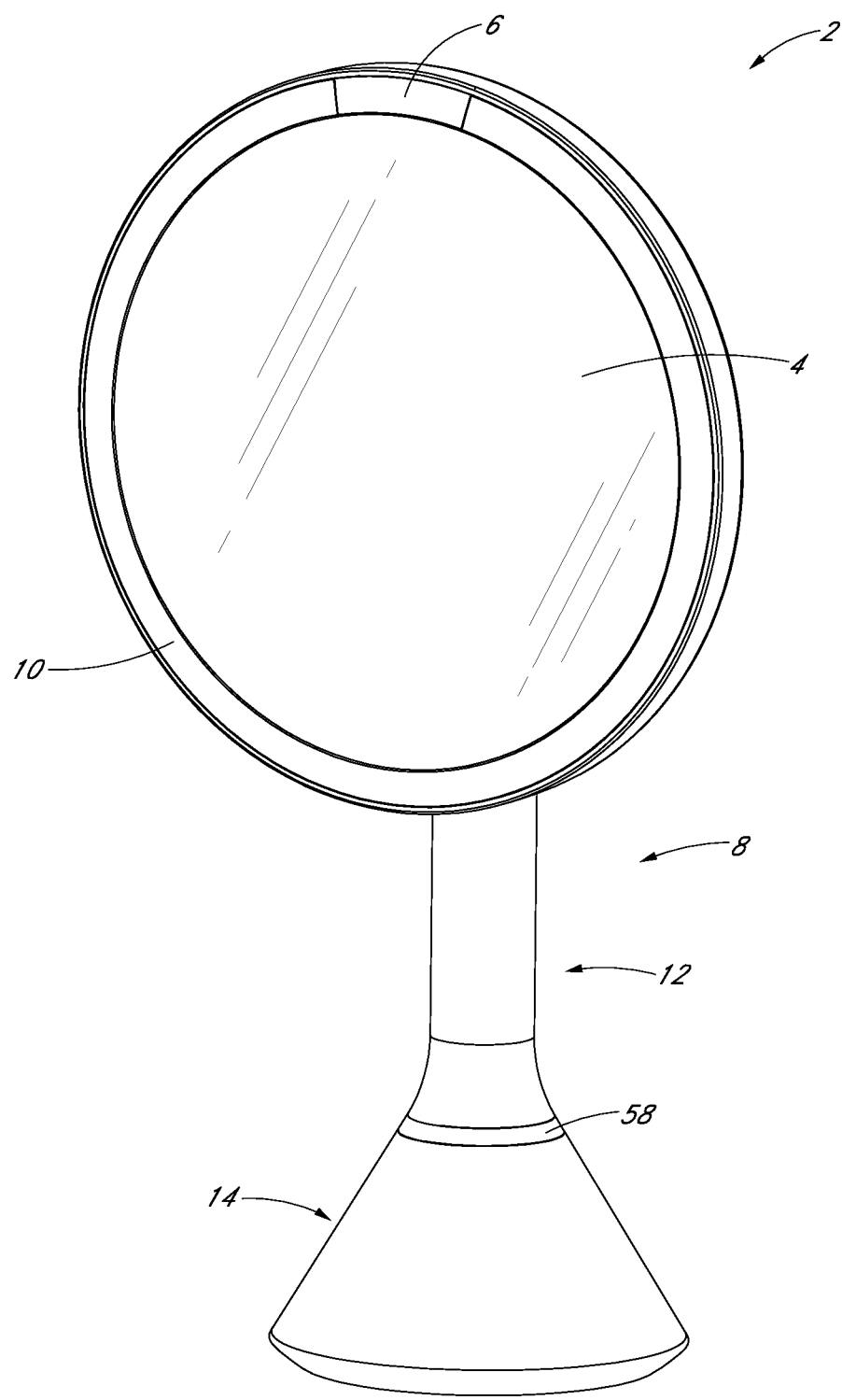
FIG. 1 illustrates a perspective view of an embodiment of a mirror assembly.
Figure 2:
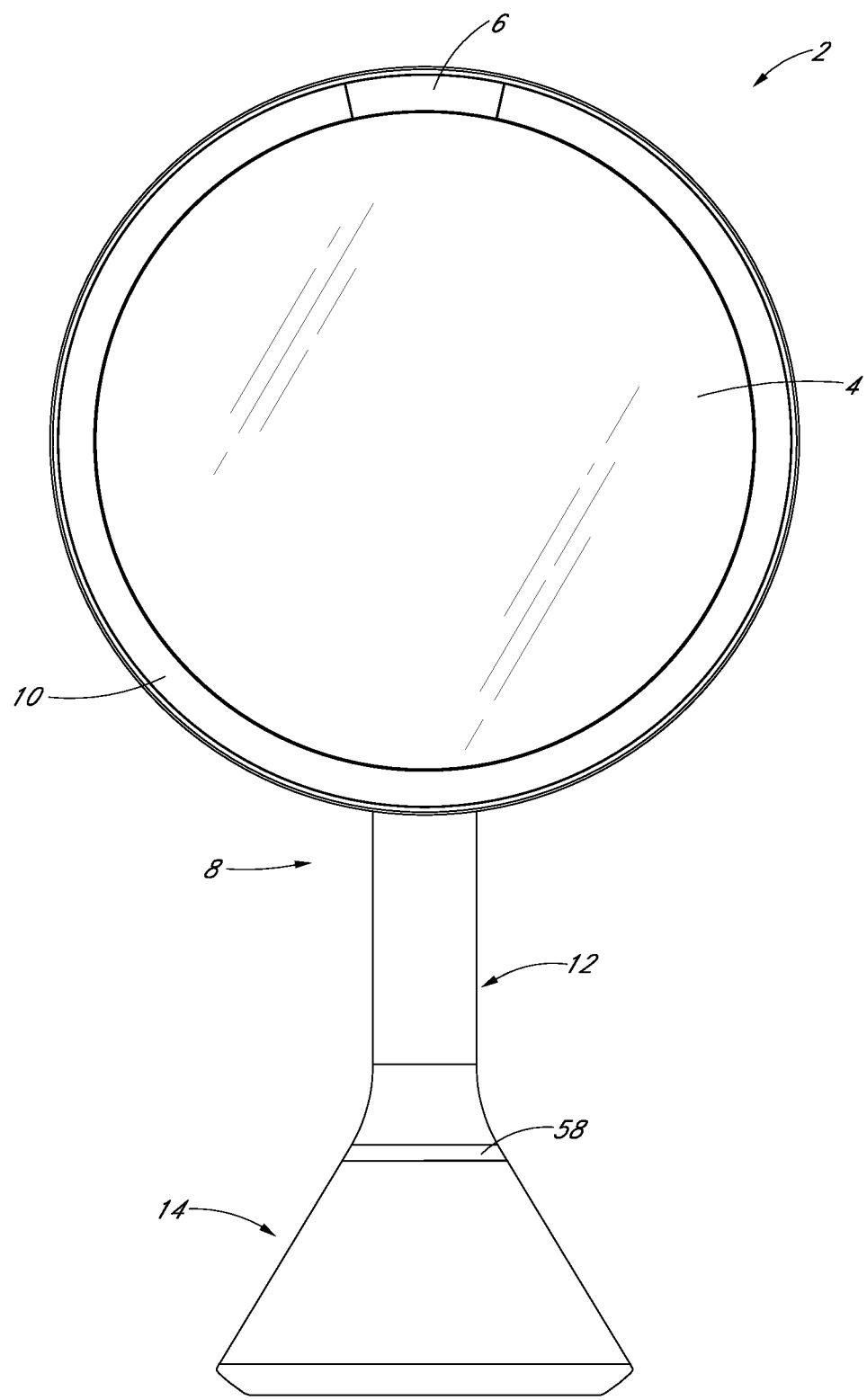
FIG. 2 illustrates a front view of the embodiment of FIG. 1.
Figure 3:
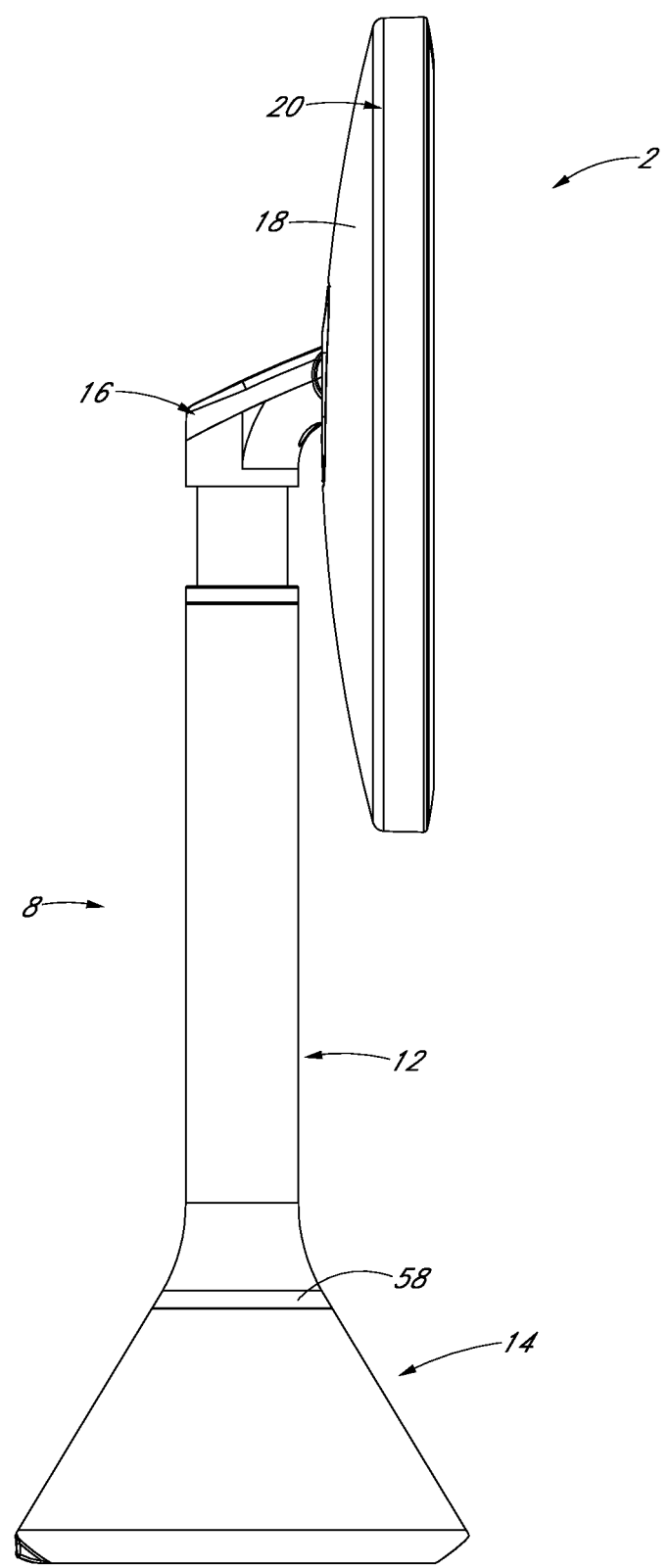
FIGS. 3 and 4 illustrate side views of the embodiment of FIG. 1.
Figure 4:
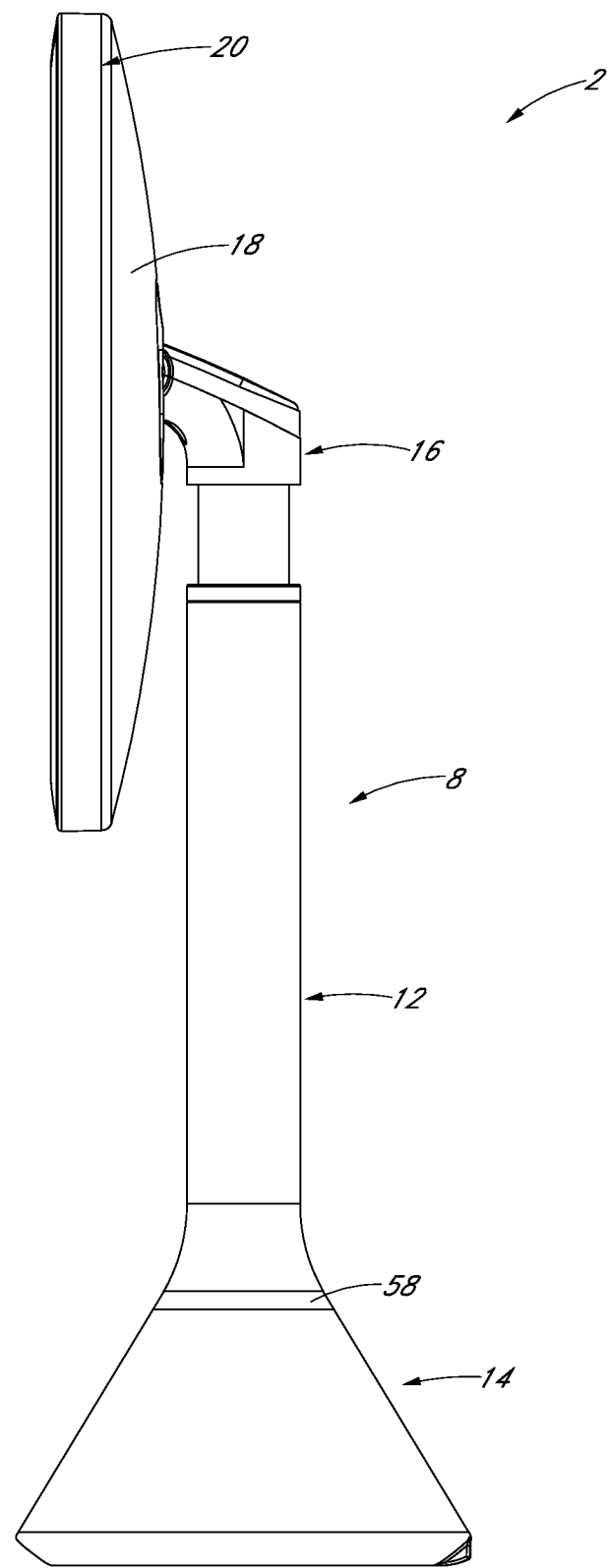
Figure 5:
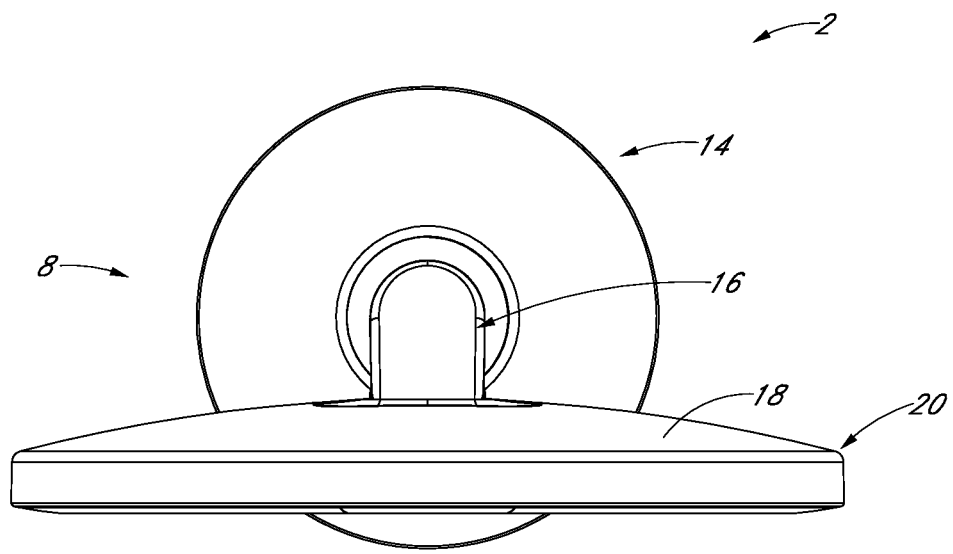
FIG. 5 illustrates a top view of the embodiment of FIG. 1.
Figure 6:
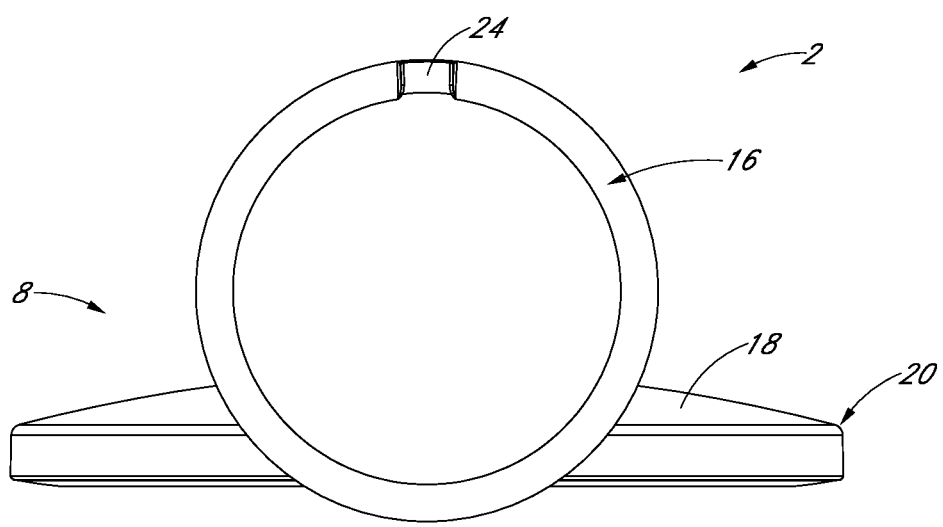
FIG. 6 illustrates a bottom view of the embodiment of FIG. 1.
Figure 7:
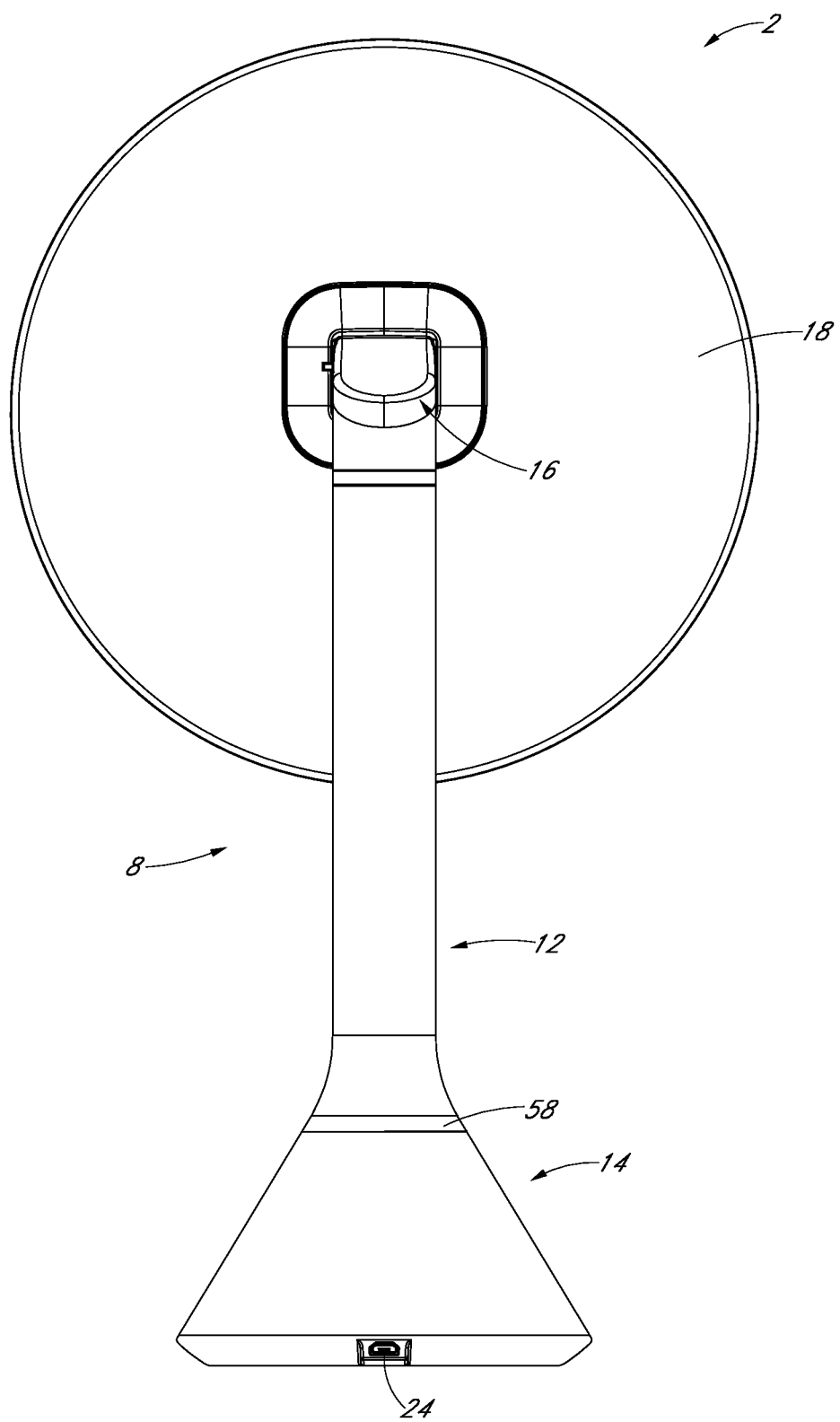
FIG. 7 illustrates a rear view of the embodiment of FIG. 1.

Certain embodiments of a mirror assembly are disclosed in the context of a portable, free-standing vanity mirror, as it has particular utility in this context. However, the various aspects of the present disclosure can be used in many other contexts as well, such as wall-mounted mirrors, mirrors mounted on articles of furniture, automobile vanity mirrors (e.g., mirrors located in sun-visors), and otherwise. None of the features described herein are essentially or indispensable. Any feature, structure, or step disclosed herein can be replaced with or combined with any other feature, structure, or step disclosed herein, or omitted.

As shown in FIGS. 1-7, the mirror assembly 2 can include a housing portion 8 and a visual image reflective surface, such as a mirror 4. The housing portion 8 can include a support portion 20, a shaft portion 12, and/or a base portion 14. The housing portion 8 can also include a pivot portion 16 connecting the support portion 20 and the shaft portion 12. Certain components of the housing portion 8 can be integrally formed or separately formed and connected together to form the housing portion 8. The housing 8 can include plastic, stainless steel, aluminum, or other suitable materials.

The mirror assembly 2 can include one or more of the components described in connection with FIGS. 8A and 8B. FIG. 8B illustrates a mirror assembly 102 including many components similar to the mirror assembly 2 components. The similar components include similar reference numbers in the 100s (e.g., mirror 4 can be similar to mirror 104).

The mirror 4 can include a generally flat or generally spherical surface, which can be convex or concave. The radius of curvature can depend on the desired optical power. In some embodiments, the radius of curvature can be at least about 15 inches and/or less than or equal to about 30 inches. The focal length can be half of the radius of curvature. For example, the focal length can be at least about 7.5 inches and/or less than or equal to about 15 inches. In some embodiments, the radius of curvature can be at least about 18 inches and/or less than or equal to about 24 inches. In some embodiments, the mirror 4 can include a radius of curvature of about 20 inches and a focal length of about 10 inches. In some embodiments, the mirror 4 is aspherical, which can facilitate customization of the focal points.

In some embodiments, the radius of curvature of the mirror 4 is controlled such that the magnification (optical power) of the object is at least about 2 times larger and/or less than or equal to about 7 times larger. In certain embodiments, the magnification of the object is about 5 times larger. In some embodiments, the mirror can have a radius of curvature of about 19 inches and/or about 7 times magnification. In some embodiments, the mirror can have a radius of curvature of about 24 inches and/or about 5 times magnification.

Figure 8A:
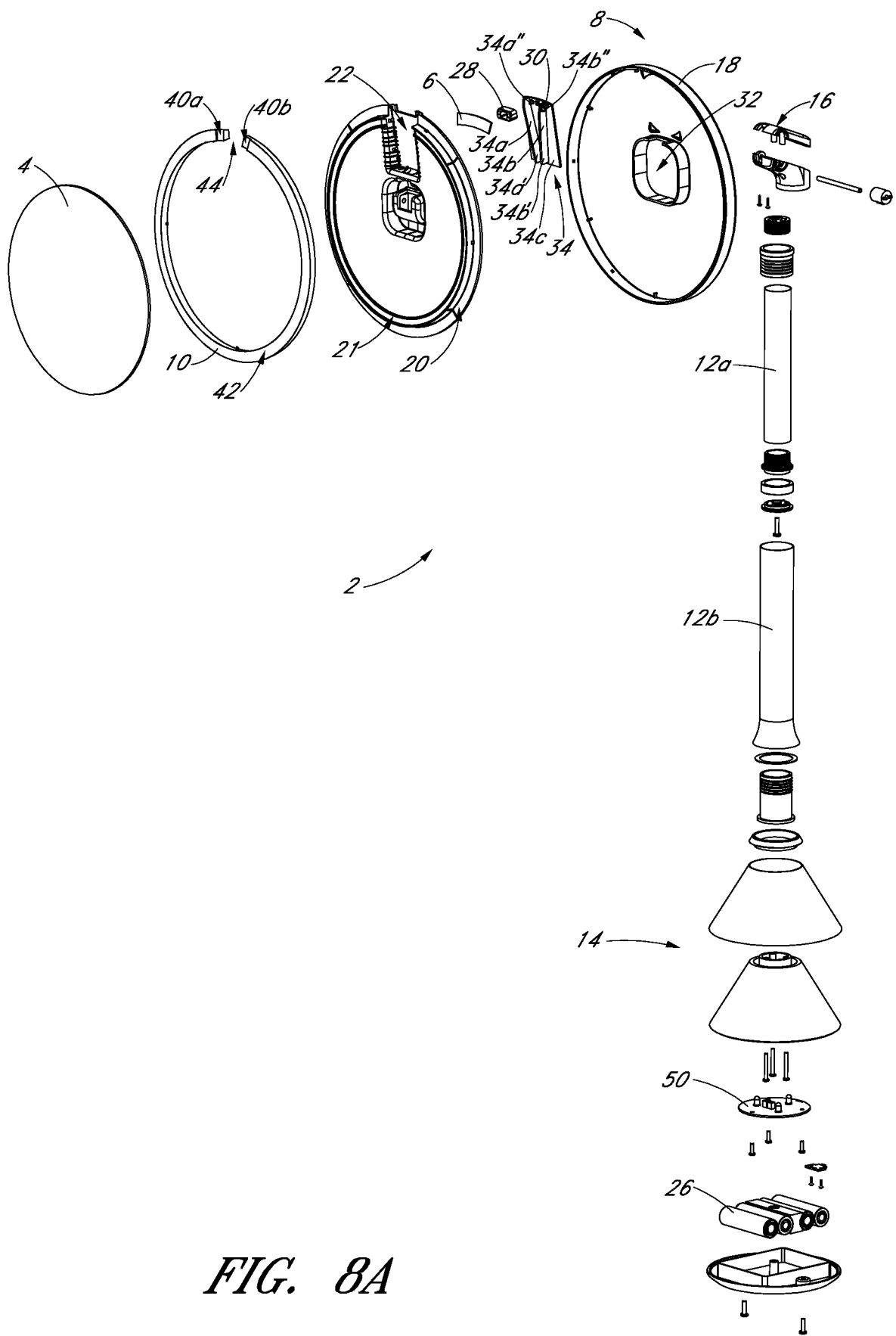
FIG. 8A illustrates an exploded view of an embodiment of the mirror assembly.
Figure 8B:
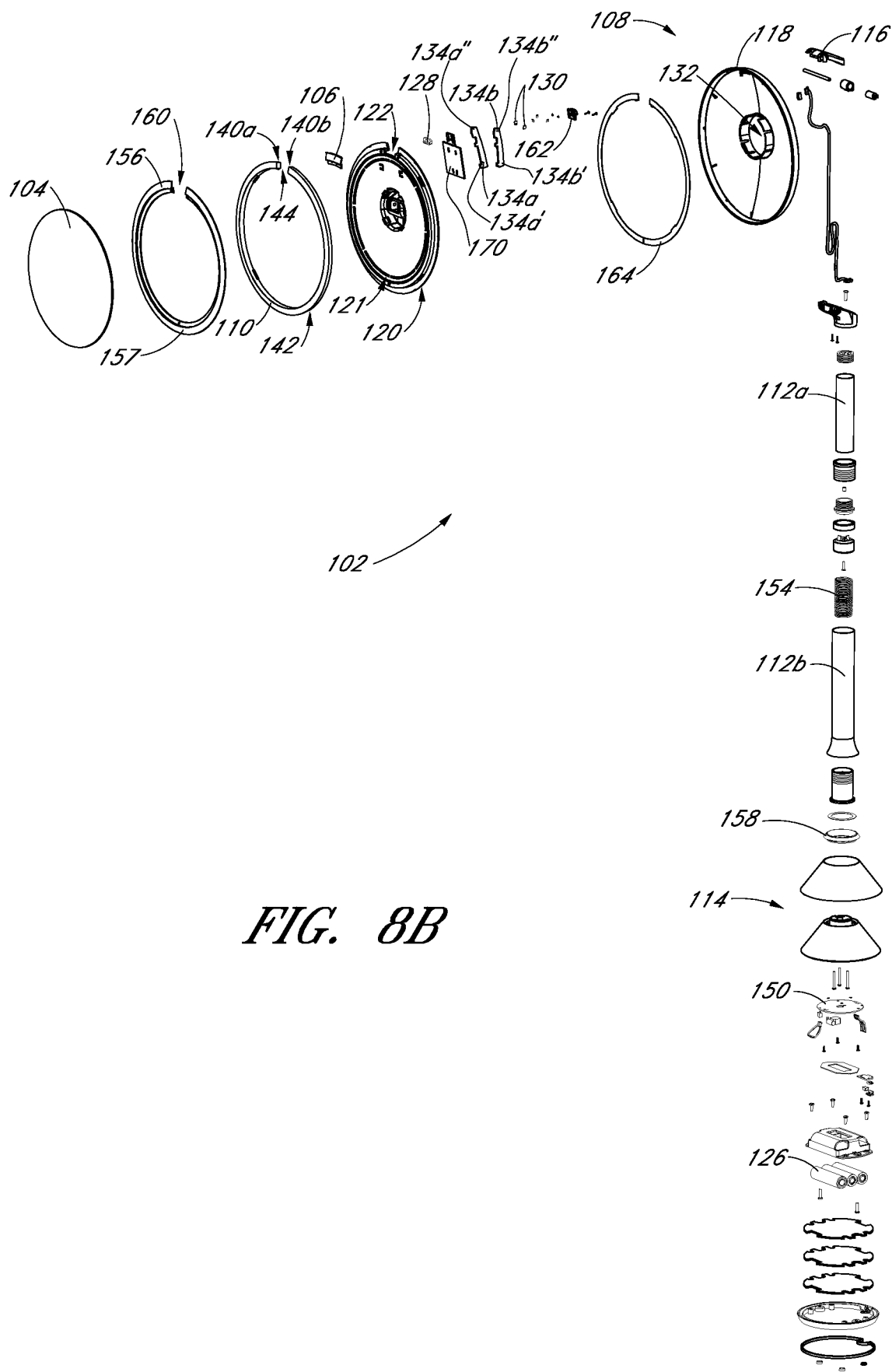
FIG. 8B illustrates an exploded view of another embodiment of the mirror assembly.

As shown in FIG. 8A, the mirror 4 can have a generally circular shape. In other embodiments, the mirror 4 can have an overall shape that is generally elliptical, generally square, generally rectangular, or any other shape. In some embodiments, the mirror 4 can have a diameter of at least about 8 inches and/or less than or equal to about 12 inches. In some embodiments, the mirror 4 can have a diameter of about 8 inches. In certain embodiments, the mirror 4 can have a diameter of at least about 12 inches and/or less than or equal to about 16 inches. In some embodiments, the mirror 4 can include a thickness of at least about 2 mm and/or less than or equal to about 3 mm. In some embodiments, the thickness is less than or equal to about two millimeters and/or greater than or equal to about three millimeters, depending on the desired properties of the mirror 4 (e.g., reduced weight or greater strength). In some embodiments, the surface area of the mirror 4 is substantially greater than the surface area of the base 14. In other embodiments, the surface area of the image-reflecting surface of the mirror 4 is greater than the surface area of the base 14.

The mirror 4 can be highly reflective (e.g., has at least about 90% reflectivity). In some embodiments, the mirror 4 has greater than about 70% reflectivity and/or less than or equal to about 90% reflectivity. In other embodiments, the mirror 4 has at least about 80% reflectivity and/or less than or equal to about 100% reflectivity. In certain embodiments, the mirror has about 87% reflectivity. The mirror 4 can be cut out or ground off from a larger mirror blank so that mirror edge distortions are diminished or eliminated. One or more filters can be provided on the mirror to adjust one or more parameters of the reflected light. In some embodiments, the filter comprises a film and/or a coating that absorbs or enhances the reflection of certain bandwidths of electromagnetic energy. In some embodiments, one or more color adjusting filters, such as a Makrolon filter, can be applied to the mirror to attenuate desired wavelengths of light in the visible spectrum.

The mirror 4 can be highly transmissive (e.g., nearly 100% transmission). In some embodiments, transmission can be at least about 90%. In some embodiments, transmission can be at least about 95%. In some embodiments, transmission can be at least about 99%. The mirror 4 can be optical grade and/or comprise glass. For example, the mirror 4 can include ultra clear glass. Alternatively, the mirror 4 can include other translucent materials, such as plastic, nylon, acrylic, or other suitable materials. The mirror 4 can also include a backing including aluminum or silver. In some embodiments, the backing can impart a slightly colored tone, such as a slightly bluish tone to the mirror. In some embodiments, an aluminum backing can prevent rust formation and provide an even color tone. The mirror 4 can be manufactured using molding, machining, grinding, polishing, or other techniques.

Figure 9:
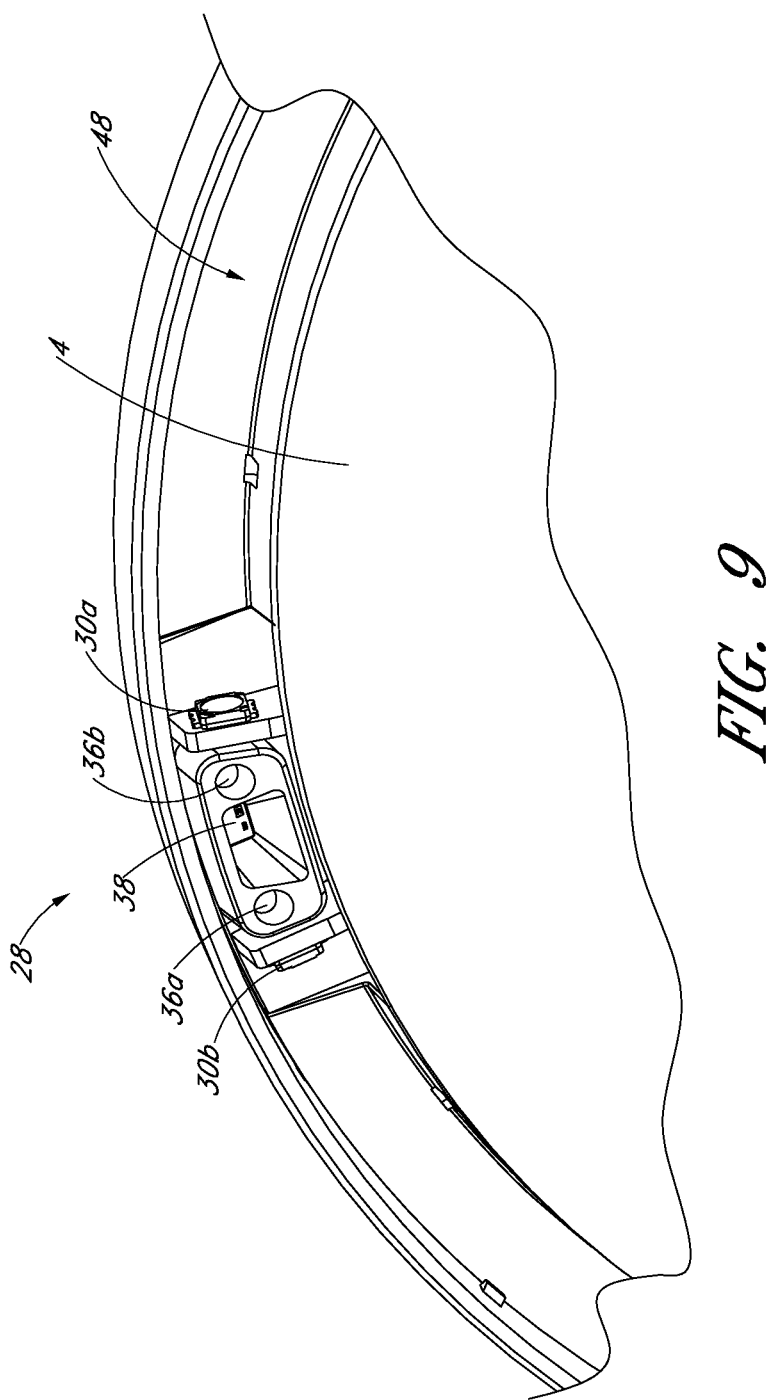
FIG. 9 illustrates an enlarged view of the embodiment of FIG. 8A showing a sensor assembly.

The mirror assembly 2 can include one or more light sources 30 configured to transmit light. For example, as shown in FIG. 9, the mirror assembly can include a plurality (e.g., two) of light sources 30. Various light sources 30 can be used. For example, the light sources 30 can include light emitting diodes (LEDs), fluorescent light sources, incandescent light sources, halogen light sources, or otherwise. In some embodiments, each light source 30 consumes at least about 2 watts of power and/or less than or equal to about 3 watts of power. In certain embodiments, each light source 30 consumes about 2 watts of power.

In certain embodiments, the width of each light source can be less than or equal to about 10.0 mm. In certain embodiments, the width of each light source can be less than or equal to about 6.5 mm. In certain embodiments, the width of each light source can be less than or equal to about 5.0 mm. In certain embodiments, the width of each light source can be about 4.0 mm.

The light sources 30 can be configured to mimic or closely approximate natural light with a substantially full spectrum of light in the visible range. In some embodiments, the light sources 30 have a color temperature of greater than or equal to about 4500 K and/or less than or equal to about 6500 K. In some embodiments, the color temperature of the light sources 30 is at least about 5500 K and/or less than or equal to about 6000 K. In certain embodiments, the color temperature of the light sources 30 is about 5700 K.

In some embodiments, the light sources 30 have a color rendering index of at least about 70 and/or less than or equal to about 90. Certain embodiments of the one or more light sources 30 have a color rendering index (CRI) of at least about 80 and/or less than or equal to about 100. In some embodiments, the color rendering index is high, at least about 87 and/or less than or equal to about 92. In some embodiments, the color rendering index is at least about 90. In some embodiments, the color rendering index can be about 85.

In some embodiments, the luminous flux can be at least about 80 lm and/or less than or equal to about 110 lm. In some embodiments, the luminous flux can be at least about 90 lm and/or less than or equal to about 100 lm. In some embodiments, the luminous flux can be about 95 lm.

In some embodiments, the forward voltage of each light source can be at least about 2.4 V and/or less than or equal to about 3.6 V. In some embodiments, the forward voltage can be at least about 2.8 V and/or less than or equal to about 3.2 V. In some embodiments, the forward voltage is about 3.0 V.

In some embodiments, the illuminance at an outer periphery of the sensing region is at least about 500 lux and/or less than or equal to about 1000 lux. The illuminance level can be higher at a distance closer to the face of the mirror. In some embodiments, the illuminance at an outer periphery of the sensing region is about 700 lux. In some embodiments, the illuminance at an outer periphery of the sensing region is about 600 lux. In some embodiments, the sensing region extends about 8 inches away from the face of the mirror. Many other sensing regions can also be utilized, some of which are described below. In certain variants, the mirror assembly 2 can include a dimmer to adjust the intensity of the light.

In some embodiments, the light sources 30 are configured to provide multiple colors of light and/or to provide varying colors of light. For example, the light sources 30 can provide two or more discernable colors of light, such as red light and yellow light, or provide an array of colors (e.g., red, green, blue, violet, orange, yellow, and otherwise). In certain embodiments, the light sources 30 are configured to change the color or presence of the light when a condition is met or is about to be met. For example, certain embodiments momentarily change the color of the emitted light to advise the user that the light is about to be deactivated.

As shown in FIG. 9, the light sources can be positioned near the uppermost region of the mirror assembly 2. In other embodiments, the light sources 30 are positioned at other portions of the mirror assembly 2, such as, within the light pipe 10 or directly mounted to the mirror 4 at spaced-apart intervals around the periphery of the mirror 4. For example, the light sources 30 can be positioned around some, substantially all, or all of the periphery of the mirror 4. In certain embodiments, the light sources 30 is separate from and does not connect with the mirror assembly 2.

The light sources 30 can be positioned in various orientations in relation to each other, such as side-by-side, back-to-back, or otherwise. In certain embodiments, the light sources 30 can be positioned to emit light in opposing directions. For example, as shown in FIG. 9, a first light source 30a projects light in a first direction (e.g., clockwise) around the periphery of the mirror 4, and a second light source 30b projects light in a second direction (e.g., counterclockwise) around the periphery of the mirror 4. In certain embodiments, the light sources 30 can be positioned to emit light generally orthogonally to the viewing surface of the mirror assembly 2. In certain embodiments, the light sources 30 can be positioned to emit light tangentially in relation to the periphery of the mirror 4.

The mirror assembly 2 can include a mechanism to actively or passively dissipate, transfer, or radiate heat energy away from the light sources 30, such as a fan, vent, and/or one or more passive heat dissipating or radiating structures 34. The support portion 20 can include a receiving portion 22 near an upper region of the mirror assembly 2 for receiving a heat dissipating structures 34. The heat dissipating structures 34 can formed of materials with a high rate of heat conduction, such as aluminum or steel, to help remove heat from the mirror assembly that is generated by the light sources 30. Many other heat dissipating materials, such as copper or brass, can be used.

The heat dissipating structures 34 can dissipate heat created by the light sources 30 and/or conduct electricity to the light sources. The heat dissipating structures 34 that both dissipate heat and conduct electricity to the light sources 30 reduce the total number of necessary components. In some embodiments, as illustrated, the heat dissipating structure 34 can include one or more components that are generally comparatively long in one dimension, generally comparatively wide in another dimension, and generally comparatively narrow in another dimension, to provide a large surface area over a thin surface to conduct heat efficiently through the heat dissipating structure 34 and then readily transfer such heat into the surrounding air and away from heat-sensitive electronic components in the mirror assembly. For example, the length of the heat dissipating structure 34 can be substantially greater than the width of the heat dissipating structure 34, and the width of the heat dissipating structure 34 can be substantially greater than the thickness.

The heat dissipating structures 34 can be electrically connected circuit boards and/or provides electric power and signals to the light sources 30 attached directly or indirectly thereto. In some embodiments, the temperature of the light sources 30 with the heat dissipating structures 34 is less than or equal to about 70° F. In some embodiments, the temperature of the light sources 30 with the heat dissipating structures 34 is between about 50° F. and 60° F.

As shown in FIG. 8A, the heat dissipating structure 34 can be a single structure including a support panel 34c positioned substantially parallel to the mirror 4. In some embodiments, the support panel 34c is a circuit board. The heat dissipating structure 34 can also include one or more fins mounted to the support panel 34c. As shown in FIG. 8A, the heat dissipating structure 34 can include two fins 34a, 34b. The fins 34a, 34b can be positioned between the support panel 34c and the mirror 4. The fins 34a, 34b can also be positioned such that the first ends of each of the fins 34a', 34b' are closer together than the second ends of the fins 34a", 34b" (e.g., V-shaped). The fins 34a, 34b can be directly or indirectly connected to the light sources 30. For example, each fin 34a, 34b can receive a light source 30.

As shown in FIG. 8B, the heat dissipating structures 134a, 134b can be separate components. Similar to FIG. 8A, the heat dissipating structures 134a, 134b can be positioned such that the first ends of each of the structures 134a', 134b' are closer together than the second ends of the fins 134a", 134b" (e.g., generally V-shaped). The structures 134a, 134b can be directly or indirectly connected to the light sources 130. For example, each of the structures 134a, 134b can receive a light source 130.

Figure 10:
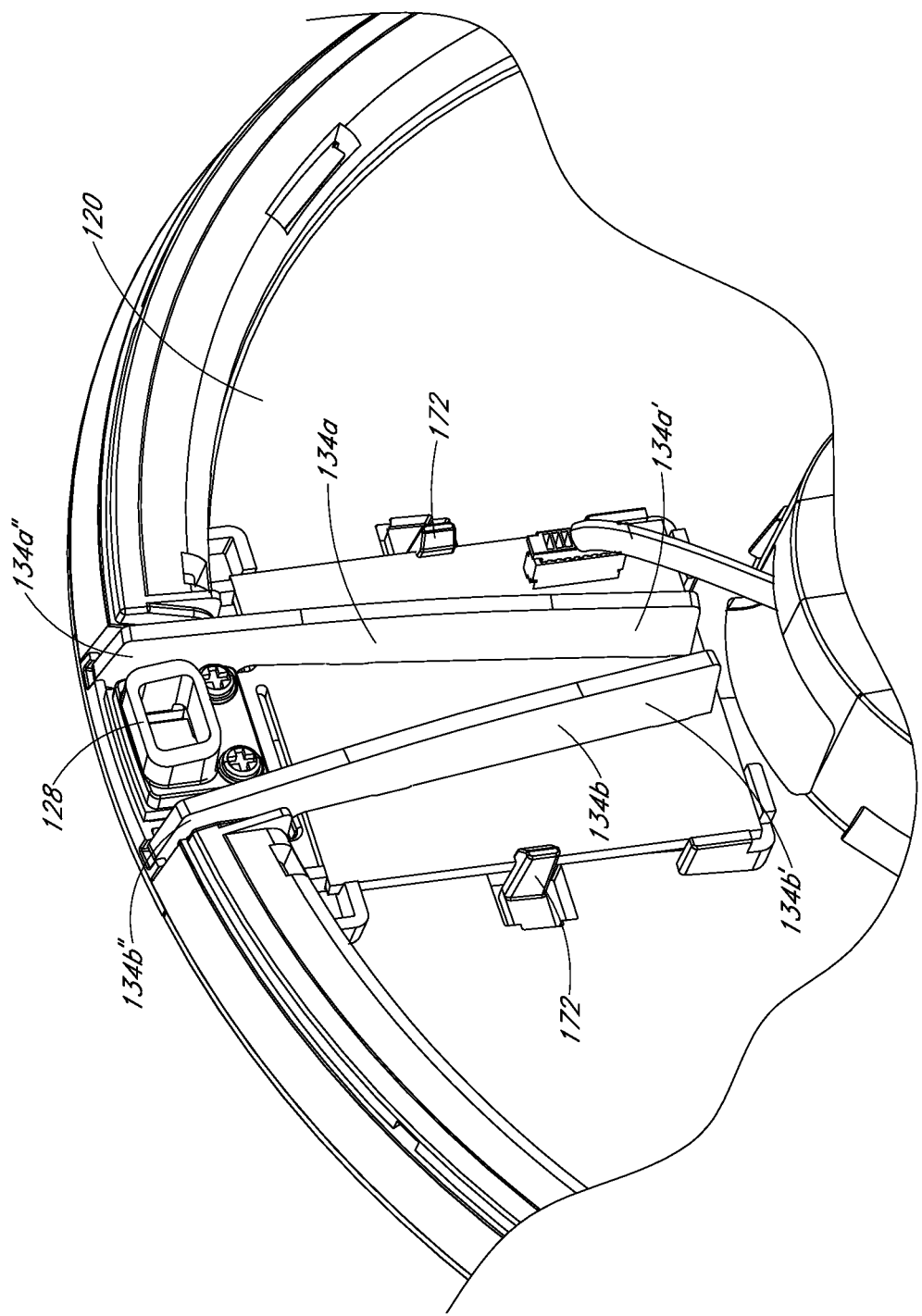
FIG. 10 illustrates an enlarged view of the embodiment of FIG. 8B showing a rear side of a sensor assembly.

FIG. 10 shows a rear side of the mirror assembly 102 without a rear cover portion 118. The second end of each of the heat dissipating structures 134a", 134b" can be positioned between the first end 140a and the second end 140b of the light pipe and on either side of the sensor assembly 128. The heat dissipating structures 134a, 134b can be positioned behind the support structure 120. For example, the heat dissipating structures 134a, 134 can be positioned between a circuit board 170 and the rear cover portion (not shown). The support portion 120 can also include one or more clasps 172 or other structures for engaging the circuit board 170.

The support portion 20 can support the mirror 4 and a light conveying structure, such as a light pipe 10, positioned around at least a portion of a periphery of the mirror 4. In some embodiments, the light pipe 10 is positioned only along an upper portion of mirror 4 or a side portion of the mirror 4. In other embodiments, the light pipe 10 extends around at least majority of the periphery of the mirror 4, substantially the entire periphery of the mirror 4, or around the entire periphery of the mirror 4. As shown in FIG. 8A, the support portion 20 can include a structure, such as a ridge 21, which can support the light pipe 10 (e.g., a portion of the light pipe 10 can be disposed along the ridge 21).

Some or all of the light from the light sources 30 can be transmitted generally toward, or into, the light pipe 10. For example, as shown in FIG. 8A, the light pipe 10 can include ends 40a, 40b, and the light sources 30 can emit light into one or both of the ends 40a, 40b of the light pipe 10. The light sources 30 can be positioned such that the light is emitted generally toward a user facing the viewing surface of the mirror assembly 2. For example, some or all of the light from the light sources 30 and/or the light pipe 10 can be emitted toward, and reflected off of, another component before contacting the user. In some embodiments, the light sources 30 are positioned behind the mirror 4 (e.g., creating a backlighting effect of the mirror 4). In some embodiments, the light sources 30 are positioned (e.g., by tilting) such that light emitted from the light sources 30 contacts the viewing surface of the mirror assembly 2 at an angle, such as an acute angle. In some embodiments, the light sources 30 are positioned such that light emitted from the light sources 30 contacts the viewing surface of the mirror assembly 2 at an obtuse angle.

When installed on the support member 20, the light pipe 10 has a radial width and an axial depth. Some variants have a radial width that is greater than or equal to than the axial depth. In certain implementations, the light pipe 10 is configured to provide adequate area for the reflecting surface of the mirror 4 and to provide sufficient area for light to be emitted from the light pipe 10, as will be discussed in more detail below. For example, the ratio of the radial width of the light pipe 10 to the radius of the mirror 4 can be less than or equal to about: $\frac{1}{5}$, $\frac{1}{15}$, $\frac{1}{30}$, $\frac{1}{50}$, values in between, or otherwise.

As shown in FIG. 8A, the light pipe 10 can be substantially circularly shaped. The light pipe 10 can include a gap 44, and the sensor assembly 28 and/or the light sources 30 can be positioned in the gap 44. In some embodiments, the light pipe 10 can be substantially linearly shaped, or the light pipe 10 has a non-linear and non-circular shape. The light pipe 10 can include acrylic, polycarbonate, or any other clear or highly transmissive material. The light pipe 10 can be at least slightly opaque.

The light can pass along and through a portion of the light pipe 10 and/or emit from the light pipe 10 via an outer face 42 of the light pipe 10. In some embodiments, the light pipe 10 is configured to transmit at least about 95% of the light emitted from the light sources 30. The light sources 30 can be configured, in combination with light pipe 10, to emit light generally around the periphery of the mirror 4. The light pipe 10 can be configured to disperse light from the light sources 30 through the light pipe 10. The light sources 30 and the light pipe 10 can be configured such that the amount of light emitted from the outer face 42 is substantially constant along the length of the light pipe 10. Many different ways of achieving a substantially constant intensity of conveyed light around the light pipe 10 can be used.

The support portion 20 and/or the light pipe 10 can include features to facilitate generally even or uniform diffusion, scattering, and/or reflection of the light emitted by the light sources 30 around the periphery of the mirror. For example, the support portion 20 and/or light pipe 10 can include an irregular anterior and/or posterior surface that is molded in a non-flat and/or non-planar way, etched, roughened, painted, and/or otherwise surface modified. The light scattering elements can be configured to disperse a substantially constant amount of light along the periphery of the mirror 4. These features can help achieve high energy-efficiency, reducing the total number of light sources necessary to light substantially the entire periphery of the mirror and reducing the temperature of the mirror assembly 2.

The light pipe 10 can comprise a generally translucent material with varying degrees of scattering, such that the minimum amount of scattering occurs in a region near the light source(s) and the maximum scattering occurs in a region of the light pipe 10 that is located furthest from the light source(s). The light pipe 10 can comprise a region configured to scatter light in a varying manner. In some embodiments, the light conveying pathway or light pipe 10 can comprise a varying, non-constant, non-smooth anterior, posterior, and/or interior surface formed from any suitable process, such as molding, etching, roughening painting, coating, and/or other methods. In some embodiments, one or more surface irregularities can be very small bumps, protrusions, and/or indentations.

In some embodiments, light passing through the light pipe 10 can be scattered at a plurality of different intensity levels, depending on the location of the light within the light pipe 10. For example, light at a first location on the light pipe 10 can be scattered at a first intensity level, light at a second location on the light pipe 10 can be scattered at a second intensity level, and light at a third location on the light pipe 10 can be scattered at a third intensity level, with the third intensity level being more than the second intensity level, and the second intensity level being more than the first intensity level, etc. Many other levels of scattering and many ways of spatially increasing or decreasing scattering can be used instead of or in addition to providing macro scattering elements, such as spatially varying a level of die or a frosting effect within the material of the light pipe 10, or by spatially varying scattering particles embedded within the material, or by spatially varying a surface pattern on one or more outside surfaces of the material.

Figure 11:
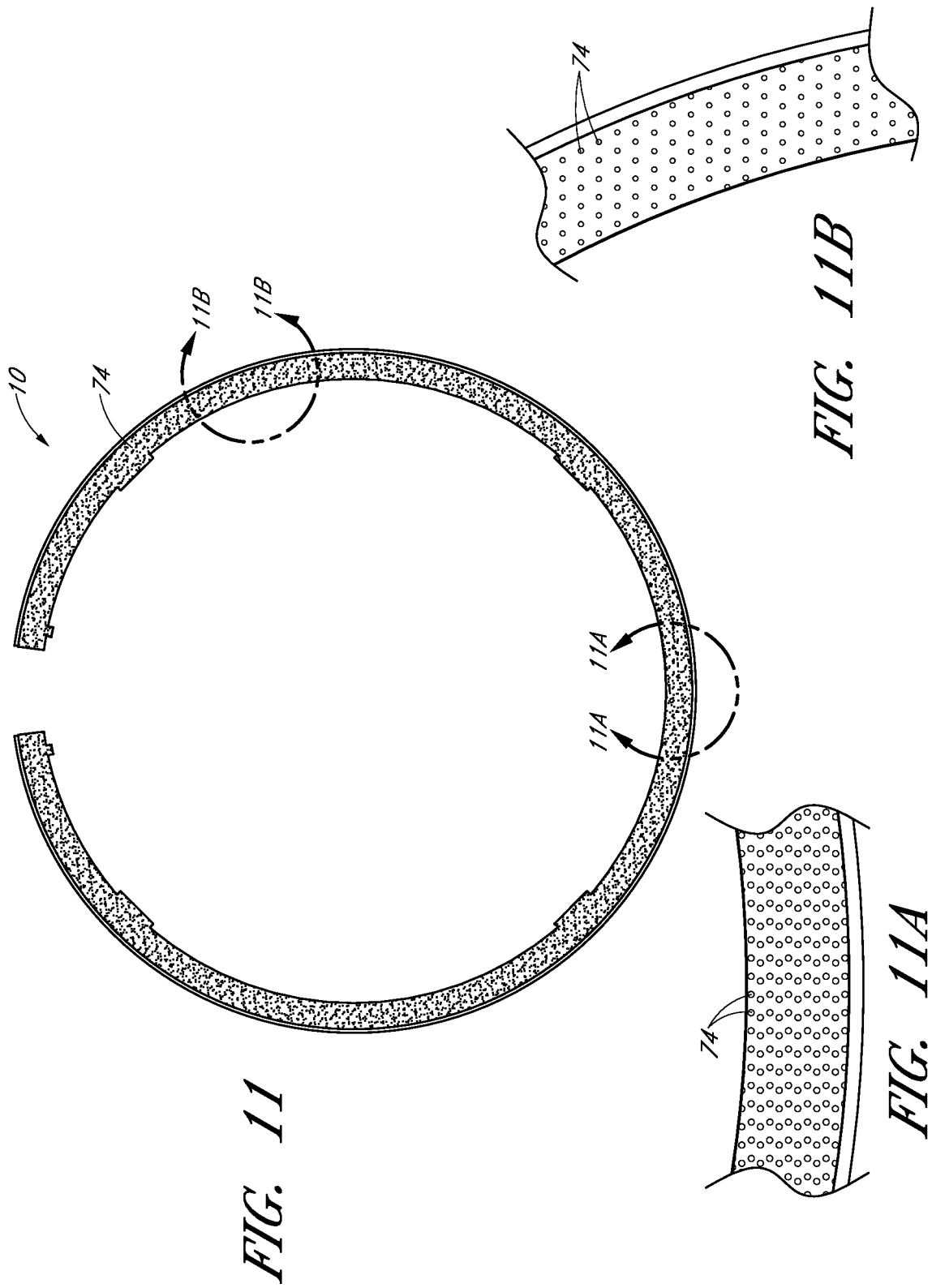
FIG. 11 illustrates a light conveying pathway of the embodiment shown in FIG. 1.

The light pipe 10 can include a surface pattern, such as light scattering elements 74 (e.g., a dot pattern) as shown in FIG. 11. The light scattering elements 74 can be configured to encourage a portion of the light passing through the light pipe 10 to exit the outer face 42 of the light pipe 10, thereby generally illuminating the user in a generally even or generally uniform manner. The light scattering elements can be configured such that the light intensity emitted from the outer face 42 of the light pipe 10 is substantially constant along a substantial portion of, or virtually the entirety of, the length of the light pipe 10. Accordingly, the user can receive generally constant light volume or intensity around the periphery of the mirror 4. For example, the light scattering elements can include one or more of varied density, irregular patterns, or varied sizes.

As shown in FIG. 11, the light scattering elements 74 can be less dense near the light sources 30 (FIG. 11B), and become increasingly dense as a function of increased distance from the light sources 30 (FIG. 11A). Such a configuration can, for example, reduce the amount of light that is scattered or reflected (and thus exits the outer face 42) in areas having generally increased light volume or light intensity, such as portions of the light pipe 10 that are near the light sources 30. Further, such a configuration can encourage additional scattering or reflection (and thus increase the amount that exits the outer face 42) in areas having generally decreased light volume or intensity, such as portions of the light pipe 10 that are spaced away from the light sources 30. Accordingly, the mirror assembly 2 can avoid bright areas at some portions of the periphery of the mirror 4 and dark areas at other portions. The mirror assembly 2 can have a substantially constant amount of light emitted along some, substantially all, or all of the periphery of the mirror 4.

The light scattering elements can be dispersed in an irregular pattern, such that the light scattering pattern in a first region is different than a light scattering pattern in a second region. A distance between a first light scattering element and a second light scattering element can be different than a distance between a first light scattering element and a third light scattering element.

The sizes (e.g., the diameter) of the light scattering elements can be varied. In some variants, the light scattering elements near the light sources 30 can have a smaller size when compared to light scattering elements that are farther from the light sources 30. For example, the light scattering elements can include a smaller diameter near the light sources 30 and become increasingly larger as a function of distance from the light sources 30. Such a configuration allows substantially even reflection of light to the outer surface 42. In certain embodiments, each light scattering element has a diameter of less than or equal to about one millimeter. In some embodiments, the light scattering elements each have a diameter greater than or equal to about one millimeter.

In some embodiments, the light scattering elements can be generally circular. In some embodiments, the light scattering elements have other shapes, such as generally square, generally rectangular, generally pentagonal, generally hexagonal, generally octagonal, generally oval, and otherwise. In certain embodiments, the pattern in the light pipe 10 is a series of lines, curves, spirals, or any other pattern. In certain embodiments, the light scattering elements are white. The light scattering elements can be dispersed such that the light pipe 10 appears frosted. In some embodiments, the light scattering elements are not easily visible to the user. For example, the light pipe 10 can be slightly opaque to conceal the appearance of the surface pattern. In some embodiments, the light scattering elements are visible to the user, the light pipe 10 can be clear to show the general color and pattern of the surface elements.

The light pipe 10 can include a reflective material to achieve high reflectivity. For example, the light pipe 10 can include a reflective backing material along the rear side of the light pipe. In some embodiments, the reflective material can reflect at least about 95% of light. In some embodiments, the reflective material reflects about 98% of light. The reflective material can be optically reflective paper.

As shown in FIG. 8B, the mirror assembly 102 can also include a diffuser 156. The diffuser 156 can be positioned on the surface of the light pipe 110 and/or around the periphery of the mirror 104. For example, the diffuser 156 can be positioned between the light pipe 10 and the user to provide a diffuse, scattered light source, not a focused, sharp light source, which would be less comfortable on the user's eyes. In some embodiments, the transmissivity of the diffuser is substantially constant around its perimeter or circumference. In some embodiments, the diffuser 156 can surround a majority of the periphery of the mirror 104, substantially the entire periphery of the mirror, or the entire periphery of the mirror. As shown in FIG. 8B, the diffuser 156 can surround generally the same portion of the periphery of the mirror 104 as the light pipe 110. The diffuser 156 can also include an opening 160 for the sensor assembly 128 and/or a receiving portion 157 for receiving the mirror 104. The diffuser 156 can include an at least partially opaque material. For example, the diffuser 156 can include optical grade acrylic.

The diffuser 156 can include an irregular anterior and/or posterior surface formed from etching, roughening, painting, and/or other methods of surface modification. For example, the diffuser 156 can include a pattern of light scattering elements (not shown) created using any of the methods discussed herein. The light scattering elements can be modified to include any of the shapes and/or sizes discussed in connection with the light pipe 10.

The light scattering elements can be configured to create soft light by further scattering the light. For example, the light scattering elements can include a plurality of dots having the same diameter or different diameters. In some embodiments, the light scattering elements can be evenly dispersed across the diffuser 156. In other embodiments, the light scattering elements can be randomly dispersed across the diffuser 156.

Returning to FIG. 8A, a cover member 6 can cover the sensor assembly 28 and the light sources 30. The cover member 6 can be clear and polished acrylic, polycarbonate, or any other suitable material. On the rear side, the housing 8 can include a rear cover portion 18, which can be configured to at least partially enclose one or more components of the mirror assembly 2. The rear cover portion 18 can include an aperture 32 through which the pivot portion 16 can extend to engage with the support portion 20. The rear cover portion 18 can also include one or more vents to further reduce the temperature. As shown in FIG. 8B, the mirror assembly 102 can include a gasket 164 positioned between the support portion 120 and rear cover portion 118.

As previously noted, the pivot portion 16 can connect the support portion 20 and the shaft portion 12. The pivot portion 16 allows the mirror 4 to be pivoted in one or more directions (e.g., up, down, right, left, and/or in any other direction). For example, the pivot 16 can include a ball joint, one or more hinges, or otherwise.

The support portion 20 and the mirror 4 can be adjustable (e.g., slidably movable and/or rotatable) along an axis generally parallel to the surface of the mirror 4 and to the ground and/or along an axis generally parallel to the surface of the mirror 4 and perpendicular to the ground. For example, the shaft portion 12 can be adjustable (e.g., slidably movable and/or rotatable) along an axis generally parallel to the surface of the mirror 4 and perpendicular to the ground. The support portion 20 and the mirror 4 can also be rotatable along an axis generally perpendicular from the surface of the mirror 4 (e.g., rotatable about the center of the mirror 4). The housing portion 8 can also include additional pivot portions, such as along the shaft portion 12.

To adjust the height of the mirror assembly 2, the shaft portion 12 can be configured to translate generally perpendicular to the ground when the mirror assembly 2 is positioned on the base 14. In some embodiments, the height of the shaft portion 12 can be adjusted within a range of at least about three inches and/or within a range less than four inches. In some embodiments, the height of the shaft portion 12 can be adjusted within about a four inch range. In some embodiments, the height of the shaft portion 12 can be adjusted within about a three inch range.

The shaft portion 12 can include a first shaft portion 12a and a second shaft portion 12b. The shaft portions 12a, 12b can be configured to adjustably engage each other, thereby allowing the user to select and maintain the mirror assembly 2 at a desired height. For example, the first shaft portion 12a can include one or more biased adjustment structures, such as spring-loaded retractable pegs (not shown), and the second shaft portion 12b can include one or more corresponding adjustment structures, such as notches (not shown). The pegs of the first shaft portion 12a can engage (e.g., snap into) with the notches of the second shaft portion 12b to control provide articulating adjustment of the height of the mirror assembly 2.

In some embodiments, the first shaft portion 12a and the second shaft portion 12b can form an interference fit. This applied pressure allows the first shaft portion 12a and the second shaft portion 12b to be stationary relative to each other (e.g. hold the support portion 20 in desired height) without external force being applied. However, the applied pressure between the shaft portions 12a and 12b can be controlled so that when the user wants to adjust the height of the support portion 20, the pressure can be overcome and shaft portions 12a and 12b can move relative to each other. For example, the amount of force required to downwardly or upwardly adjust the height or effective length of the shaft portion 12 can be greater than the downward force of gravity induced by the mass of the mirror assembly and upper shaft portion but generally less than or equal to a natural human adjustment force for an appliance, such as less than or equal to about 3 or about 4 pounds. The sliding or adjustment of the height or effective length of the shaft components can be configured to stop virtually immediately when the user's adjustment force stops, without requiring further adjustments or securing structure to stop the sliding or to secure the components of the shaft portion against further unintended movement or change in height or length. The applied pressure can also simulate a dampening effect during movement of the shaft portions 12a and 12b.

The shaft portion 12 can also include a constraining member, such as ring member, that dampens or prevents the first shaft portion 12a from moving relative to the second shaft portion 12b. For example, certain variants of the ring member threadably engage with the second shaft portion 12b, thereby radially compressing the second shaft portion 12b against the first shaft portion 12a, which in turn inhibits the first shaft portion 12a from translating relative to the second shaft portion 12b. In certain implementations, loosening the ring member allows the user to adjust the height of the shaft portion 12, while tightening the ring member secures the first shaft portion 12a to the second shaft portion 12b.

In some embodiments, the shaft portion 12 includes a connector, such as a set-screw (not shown), which can be positioned generally perpendicular to the first shaft portion 12a. The second shaft portion 12b can include an opening (not shown) through which the screw member can extend. In certain implementations, when the set-screw is loosened, the first shaft portion 12a can be adjusted relative to the second shaft portion 12b. Tightening the screw member until it contacts the first shaft portion 12a can inhibit or prevent the first shaft portion 12a from moving relative to the second shaft portion 12b.

As shown in FIG. 8B, the shaft portion 112 can include one or more biasing members 154, such as springs (e.g., spiral coil springs, wave springs, conical springs, or otherwise). In certain variants, the one or more biasing members 154 are configured to facilitate adjustment of the height of the shaft portion 112. For example, the one or more biasing members 154 can reduce the amount of vertical force a user must exert to raise the height of the mirror 104 relative to the base 114. The biasing members can be positioned in a lumen of the shaft portion 112.

The shaft portion 12 can include plastic, stainless steel, aluminum, or other suitable materials. The first shaft portion 12a can also include compressible materials, such as rubber, nylon, and plastics, on at least a portion of its outer surface that press against the inner surface of the second shaft portion 12b when the first shaft portion 12a is inserted into the second shaft portion 12b.

A portion of the support portion 20 can be cantilevered outward from the longitudinal axis of the shaft portion 12. Such a configuration can impart a moment of force on the mirror assembly 2, which, if uncompensated for, could lead to tipping. The base portion 14 can also be configured to counteract such a moment. For example, the base portion 14 can include a weight that is sufficient to reduce substantially the likelihood of tipping of the mirror assembly 2.

The base 14 and/or other portions of the mirror assembly 2 can be generally balanced in mass distribution such that the center of mass of the mirror assembly 2 is generally positioned near the shaft 12 and/or near the base 14. The base portion 14 can weigh at least about 2 lbs., 4 lbs., 6 lbs., 8 lbs., 10 lbs., values in between, or otherwise. The base portion 14 can also include one or more supporting feet or be configured to be semi-permanently mountable (e.g., to be mounted to a countertop with one or more fasteners).

In some embodiments, as illustrated, the base portion 14 can have a generally curved outer surface. For example, a horizontal cross-section of the base at a plurality of points along its height can be generally circular or generally elliptical. In the illustrated embodiment, the base portion 14 is generally conical, such as generally frusto-conical. The outer surface of the base can be generally smooth, generally tapered and/or generally sloping, as illustrated, and/or present a virtually entirely continuous surface generally circumscribing the periphery of the base 14. The horizontal cross-sectional area or diameter of the top of the base 14 generally can be about the same as the horizontal cross-sectional area or diameter of the bottom of the shaft portion 12. The horizontal cross-sectional area of the base 14 can generally continuously increase from the top region of the base 14 to the bottom region of the base 14. For example, a horizontal cross-sectional area or diameter at the bottom region of the base 14 can be substantially larger than a horizontal cross-sectional area or diameter at the top region of the base 14 (e.g., at least about two or at least about three times larger), which is an example of a base 14 that can help resist tipping of the mirror. In some embodiments, as illustrated, the distance along the shaft portion 12 from the bottom of the mirror portion to the top of the base portion can be generally about the same as the height of the base portion 14.

Figure 12:
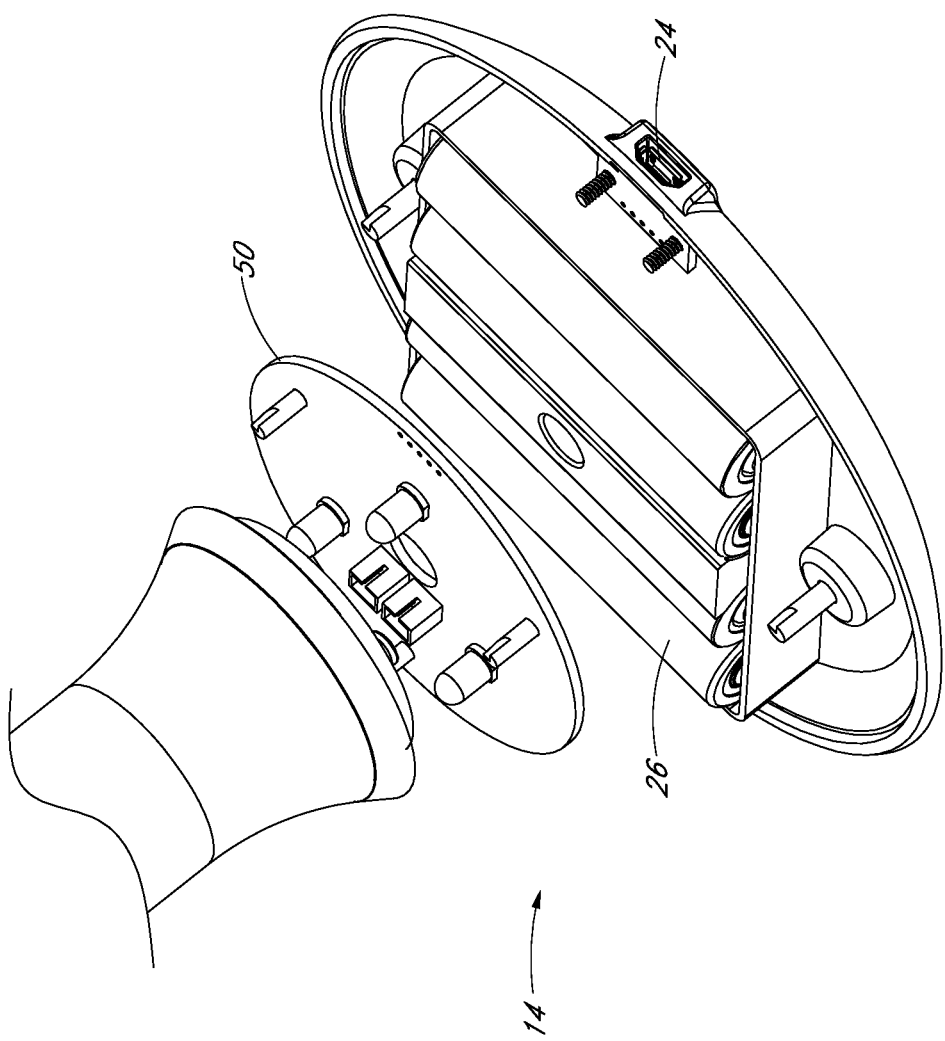
FIG. 12 illustrates an enlarged view of the embodiment of FIG. 1 showing a partially exploded view of a base portion.

As discussed in further detail below, the base portion 14 can include a battery (e.g., a rechargeable battery). The weight and positioning of the battery can also reduce the chances of tipping of the mirror assembly 2. In some embodiments, the battery can deliver power to the light sources for at least about ten minutes per day for about thirty days. The battery 26 can be recharged via a port 24 (e.g., a universal serial bus (USB) port or otherwise), as shown in FIG. 12. The port 24 can be configured to permanently or removably receive a connector coupled with a wire or cable (not shown). The port 24 can also be configured to allow electrical potential to pass between the batteries 26 with a power source via the connector. The port 24 may be used to program or calibrate different operations of the mirror illumination or object sensing when connect to a computer. Other charging methods can be used, such as via conventional electric adapter to be plugged in to an electric outlet.

The mirror assembly 2 can include an indicator device configured to issue a visual, audible, or other type of indication to a user of the mirror assembly 2 regarding a characteristic of the mirror assembly 2, the user, and/or the relationship between the mirror assembly 2 and the user. For example, the indicator can indicate on/off status, battery levels, imminent deactivation, and/or certain mode of operation. The indicator can be used for other purposes as well.

The color of the indicator light can vary depending on the indication. For example, the indicator can emit a green light when the mirror assembly is turned on and/or a red light when the battery is running low.

As shown in FIG. 1, the indicator 58 can ring-shaped and positioned around an upper portion of the base portion 14. The indicator 58 can take on any other shape and be positioned around the support portion 20, along the base portion 14, or on any other location on the mirror assembly 2.

The controller 50 controls the operation of a light sources 30. The controller 50 can be disposed in the base 14 and can include one or a plurality of circuit boards (PCBs), which can provide hard wired feedback control circuits, a processor and memory devices for storing and performing control routines, or any other type of controller.

The mirror assembly 2 can include a sensor assembly 28, as shown in FIGS. 2A and 9. The sensor assembly 28 can be positioned near an upper region of the mirror assembly 2 (e.g., the top of the mirror). For example, the sensor assembly 28 can be positioned in the gap 44 in the light pipe 10. The sensor assembly 28 can also be recessed from the front surface of the mirror assembly 2. Alternatively, the sensor assembly 28 can disposed along any other portion of the mirror assembly 2 or not positioned on the mirror assembly 2. For example, the sensor assembly 28 can be positioned in any location in a room in which the mirror assembly 2 sits. The sensor assembly 28 can include a proximity sensor or a reflective-type sensor. For example, the sensor 28 can be triggered when an object (e.g., a body part) is moved into, and/or produces movement within, a sensing region.

The sensor assembly 28 can include a transmitter and a receiver. The transmitter 36 can be an emitting portion (e.g., electromagnetic energy such as infrared light), and the receiver 38 can be a receiving portion (e.g., electromagnetic energy such as infrared light). The beam of light emitting from the light emitting portion 36 can define a sensing region. In certain variants, the transmitter can emit other types of energy, such as sound waves, radio waves, or any other signals. The transmitter and receiver can be integrated into the same sensor or configured as separate components.

In some embodiments, the light emitting portion 36 can emit light in a generally perpendicular direction from the front face of the mirror assembly. In some embodiments, the light emitting portion 36 emits light at a downward angle from a perpendicular to the front face of the mirror assembly by at least about 5 degrees and/or less than or equal to about 45 degrees. In some embodiments, the light emitting portion 36 emits light at a downward angle from a perpendicular to the front face of the mirror assembly by at least about 15 degrees and/or less than or equal to about 60 degrees. In certain embodiments, the light emitting portion 36 emits light at a downward angle of about 15 degrees.

In some embodiments, the sensor assembly 28 can detect an object within a sensing region. In certain embodiments, the sensing region can have a range from at least about 0 degrees to less than or equal to about 45 degrees downward relative to an axis extending from the sensor assembly 28, and/or relative to a line extending generally perpendicular to a front surface of the sensor assembly, and/or relative to a line extending generally perpendicular to the front face of the mirror and generally outwardly toward the user from the top of the mirror assembly. In certain embodiments, the sensing region can have a range from at least about 0 degrees to less than or equal to about 25 degrees downward relative to any of these axes or lines. In certain embodiments, the sensing region can have a range from at least about 0 degrees to less than or equal to about 15 degrees downward relative to any of these axes or lines.

In some embodiments, the sensing region can be adjusted by mounting the sensor assembly 28 at an angle. In certain embodiments, the sensor assembly 28 can be mounted such that the front surface of the sensing assembly 28 can be generally parallel or coplanar with a front surface of mirror 4. In certain embodiments, the sensor assembly 28 can be mounted such that the front surface of the sensing assembly 28 can be at an angle relative to the front surface of the mirror.

In some embodiments, the sensing region can be adjusted by modifying one or more features of the cover member 6. In certain embodiments, the cover member 6 can include a lens material. In certain embodiments, the cover member 6 can include a generally rectangular cross-section. In certain embodiments, the cover member 6 can include a generally triangular cross-section. In certain embodiments, the cover member 6 can include a front surface generally parallel or coplanar with a front surface of the mirror 4. In certain embodiments, the cover member 6 can include a front surface at an angle relative to the front surface of the mirror 4. In certain embodiments, the front surface of the cover member 6 can be positioned at an angle relative to the sensor assembly 28.

In some embodiments, the sensing area generally widens as the front surface of the cover member 6 moves from the configuration generally parallel or coplanar with the front surface of the mirror 4 to the configuration at an angle relative to the front surface of the mirror 4. In certain embodiments, when the front surface of the cover member 6 is generally parallel or coplanar with the front surface of the mirror, the sensing region can have a range from about 0 degrees to about 15 degrees downward relative to the axis extending generally from the sensor assembly 28 and/or generally perpendicular to the front surface of the sensor assembly. In certain embodiments, when the front surface of the cover member 6 is at an angle relative to the front surface of the mirror 4, the sensing region can have a range from about 0 degrees to about 25 degrees downward relative to the axis extending generally from the sensor assembly 28 and/or generally perpendicular to the front surface of the sensor assembly.

The sensor assembly 28 may only require enough power to generate a low power beam of light, which may or may not be visible to the human eye. Additionally, the sensor assembly 28 can operate in a pulsating mode. For example, the light emitting portion 36 can be powered on and off in a cycle such as, for example, for short bursts lasting for any desired period of time (e.g., less than or equal to about 0.01 second, less than or equal to about 0.1 second, or less than or equal to about 1 second) at any desired frequency (e.g., once per half second, once per second, once per ten seconds). Cycling can greatly reduce the power demand for powering the sensor assembly 28. In operation, cycling does not degrade performance in some embodiments because the user generally remains in the path of the light beam long enough for a detection signal to be generated.

If the receiving portion 38 detects reflections (e.g., above a threshold level) from an object within the beam of light emitted from the light emitting portion 36, the sensor assembly 28 sends a signal to the controller to activate a light source.

The sensor assembly 28 can send different signals to the controller 50 based on the amount of light reflected back toward the receiver 38. For example, the sensor assembly 28 is configured such that the amount of light emitted by the light sources 30 is proportional to the amount of reflected light, which can indicate the distance between the mirror 4 and the user. In certain variants, if the user is in a first sensing region, then the controller causes the one or more light sources 30 to activate from an off state or to emit a first amount of light. If the user is in a second sensing region (e.g., further away from the sensor assembly 28 than the first sensing region), then the controller causes the one or more light sources 30 to emit a second amount of light (e.g., less than the first amount of light).

The controller 50 can trigger at least two different levels of brightness from the light sources 30, such as brighter light or dimmer light. For example, if the user is anywhere in a first sensing region, then the controller 50 signals for bright light to be emitted; if the user is anywhere in a second sensing region, then the controller 50 signals for dim light to be emitted.

The controller 50 can also trigger more than two brightness levels. In certain implementations, the level of emitted light is related (e.g., linearly, exponentially, or otherwise) to the distance from the sensor to the user. For example, as the user gets closer to the sensor assembly 28, the one or more light sources 30 emit more light. Alternatively, the mirror assembly 2 can be configured to emit more light when the user is further away from the sensor assembly 28, and less light as the user moves closer to the sensor assembly 28.

The sensor assembly 28 can include two light emitting portions 36a and 36b. Each transmitter 36a, 36b emits a cone of light with proper shielding or guiding on the transmitters 36a and 36b, which defines the detection zones of the sensors (subject to the nominal range of the sensors 28). The area in which the two cones overlap creates a primary sensing region, and areas in which the two cones emit light but do not overlap create a secondary sensing region. If a user is detected in the primary sensing region, then the sensor assembly 28 sends an appropriate signal to the controller 50, which triggers a first level of light from the light sources 30. If a user is detected in the secondary sensing region, then the sensor assembly 28 sends an appropriate signal to the controller 50, which activates a second level of light from the light sources 30. In some embodiments, the first level of light is brighter than the second level of light. In other embodiments, the second level of light is brighter than the first level of light. In some embodiments, the sensor assembly 28 defines more than two sensing regions and triggers more than two levels of light.

As shown in FIG. 9, the light emitting portions 38 can be positioned generally along the same horizontal plane (e.g., relative to the ground). The sensor assembly 28 can issue an appropriate signal to the controller 50, which can trigger brighter light when the user is within a first sensing region, directly in front of the sensor assembly 28. The sensor assembly can trigger dimmer light when the user is within a second sensing region, in the periphery of the mirror assembly 2.

The sensor assembly 28 can include two or more light emitting portions 36 that do not create overlapping detection cones within the nominal range of the sensors 28. A first cone of light defines a first sensing region and a second cone of light defines a second sensing region. If a user is detected in the first sensing region alone or the second sensing region alone, then the sensor assembly 28 signals the controller 50, which activates a first level of light from the light sources 30. In certain variants, if a user is concurrently detected in the first and second sensing regions, then the sensor assembly 28 signals the controller 50 to activate a second level of light from the light sources 30. In some embodiments, the first level of light is brighter than the second level of light. In other embodiments, the second level of light is brighter than the first level of light.

Activation of the light sources 30 or adjusting the amount of light emitted from the light sources 30 can be based on factors other than the presence of a user within a sensing region. For example, the amount of light emitted from the light sources 30 can adjust based on motion within the detection zone and nominal range of the sensor 28. Certain implementations are configured such that, if a user lifts his/her hand in an upward motion, then the controller signals for the amount of light to increase, and if a user lowers his/her hand in a downward motion, then the controller signals for the amount of light to decrease.

Once a light source 30 activates, the light source 30 can remain activated so long as the sensor assembly 28 detects an object in a sensing region. Alternatively, the light source 30 remains activated for a pre-determined period of time. For example, activating the light source 30 can initialize a timer. If the sensor assembly 28 does not detect an object before the timer runs out, then the light source 30 is deactivated. If the sensor assembly 28 detects an object before the timer runs out, then the controller 50 reinitializes the timer, either immediately or after the time runs out.

The one or more sensing regions can be used in any type of configuration that allows the user to control an aspect of the operation of the mirror assembly 2. For example, the one or more sensing regions can be used to trigger the mirror assembly 2 to emit different levels of light, operate for varying durations of time, pivot the mirror, or any other appropriate parameter.

In several embodiments, the mirror assembly 2 has one or more modes of operation, for example, an on mode and an off mode. A controller 50 can activate different modes based on signals received from different sensing regions, motions, or any other parameter. Any of the modes described below can be used separately or in combination with each other.

The mirror assembly 2 can include a task mode. When the task mode is activated, the mirror assembly 2 can trigger a light source 30 to remain activated or cause the sensor to enter a hyper mode (e.g., during which the sensor is configured to have increased sensitivity to movement within a zone, or to have a larger or wider sensitivity zone, or to have some other increased sensitivity signal detection) for a pre-determined period of time. For example, in some embodiments, the task mode can be especially useful when the user plans to use the mirror assembly 2 for an extended period of time, especially if the user's body position is substantially still for an extended period, to avoid intermittent loss of lighting while the user is still looking into the mirror. The task mode can trigger a light source 30 to remain activated for a predetermined amount of time, even if the user is not detected within a sensing region. The pre-determined amount of time can be less than or equal to about: 3 minutes, 5 minutes, 10 minutes, or any other suitable period of time. If the sensor assembly 28 does not detect a user before the timer runs out, then the mirror assembly 2 deactivates task mode. In certain embodiments, the mirror assembly 2 remains in task mode until the user signals a light source 30 to deactivate.

The mirror assembly 2 can include a power saver mode. When the power saver mode is activated, the light source 30 emits less light than the mirror assembly 2 when not in power saver mode. The power saver mode can be user-activated and can be used when a user plans to use the mirror for a relatively long period of time. Alternatively, the mirror assembly 2 enters power saver mode automatically as a transition between on mode and off mode. For example, a controller 50 can initialize a timer when a light source 30 activates. If the sensor assembly 28 does not detect a user before the timer runs out, then the controller 50 enters power saver mode and initializes a second timer. If the sensor assembly 28 does not detect a user before the second timer runs out, then the controller 50 deactivates the light source 30.

The mirror assembly 2 can include a hyper mode. As described above, in some embodiments, the mirror assembly 2 has two light emitting portions 36, each emitting a cone of light. In certain implementations, the controller 50 only triggers the light sources 30 to activate when the sensor assembly 28 detects an object in the region where the two cones of light intersect (e.g., the primary sensing region). In some embodiments, after the light source 30 has been activated, the mirror assembly 2 enters hyper mode. The controller 50 can keep the light sources 30 activated as long as the sensor assembly 2 detects the user in either one or both of the cones of light (the secondary or the primary sensing regions). The secondary sensing region can be different from the primary sensing region. For example, the secondary sensing region can be larger than the primary sensing region. In some embodiments, this allows the user to move around and still keep the light source 30 activated. Hyper mode can also help save power by preventing unintentional activation when the user is near a periphery of the mirror assembly 2.

The mirror assembly 2 can also include ambient light sensing capabilities. For example, when the ambient light is relatively low, the light emitting from the light source 30 will be brighter than if the ambient light is relatively bright. The light receiving portion 38 can detect both ambient light and light emitted from the transmitter 36, or the mirror assembly 2 can include a second sensor assembly for detecting ambient light.

The controller 50 can adjust the amount of signal necessary to trigger a light source 30 based on the amount of detected ambient light. For example, the amount of detected light required to activate the light sources 30 can be proportional to the ambient light. Such a configuration can allow the light source 30 to be activated even when the level of ambient light is modest (e.g., in dimmed bathroom lighting). When the ambient light is less than or equal to a first level, the controller 50 activates light source 30 when a first level of the reflected signal is detected. When the ambient light is greater than the first level, the controller 50 activates light source 30 when a second level (e.g., greater than the first level) of the reflected signal is detected.

The controller 50 can also adjust the amount of light emitted by the light sources 30 based on the ambient light. Such a configuration can, for example, avoid emitting a starting burst of very bright light that would be uncomfortable to a user's eyes, especially when the user's eyes were previously adjusted to a lower light level, such as when the surrounding environment is dim. For example, the amount of light emitted by the light sources 30 can be proportional to the amount of ambient detected light.

The controller 50 can also gradually increase the level of emitted light from the light sources 30 when the light sources 30 are activated and/or gradually decrease the amount of light emitted from the light sources 30 when the light sources 30 are deactivated. Such a configuration can inhibit discomfort to a user's eyes when the light sources 30 turn on.

The mirror assembly 2 can also include a calibration mode. For example, the calibration mode can calibrate the different sensing regions with different output characteristics as desired by the user. An algorithm can be configured to utilize multiple sensing regions to perform different functions. For example, a user can configure a first sensing region to correspond with a first level of light (e.g., lower intensity light) and configure a second sensing region to correspond with a second level of light (e.g., higher intensity light). In another example, the user can adjust the size (e.g., width or height) of the sensing region. The user can designate a first sensing region to correspond with a first level of light and designate a second sensing region to correspond with a second level of light. This calibration mode can be triggered by a user indicator, such as pressing a button, activating a sensor, or any other appropriate mechanism.

In some embodiments, an ideal sensing region is designed so that the center of a user's face is generally positioned at about the center of the mirror portion, at a suitable perpendicular distance away from the mirror to permit the user to generally closely fit the user's face within the outer periphery of the mirror. A proximity sensor, generally positioned at the top region of the mirror, can be tilted downwardly at an angle below horizontal (e.g., at least about 10 degrees downward, such as about 15 degrees downward), and an algorithm can trigger a power change to the mirror when a user's face (or any other object) is detected within a predetermined range of distances in a perpendicular forward direction from the front face of the mirror. For example, in some embodiments, the first region can be within a range of at least about 10 inches and/or less than or equal to about 12 inches (e.g., about 11 inches) from the front face of the mirror, and the second region can be in a range of at least about 7 inches and/or less than or equal to about 9 inches (e.g., about 8 inches) from the front face of the mirror.

An algorithm can be configured to send a command to activate the light sources 30 based on the detected signal. The algorithm can also be configured to emit different levels of light or vary durations of time. The algorithm can also be configured to send a command to trigger one or more modes, including any of the modes discussed above. The command can vary based on the signal received. For example, the signal can depend on the distance between an object and the sensor assembly 28, and/or other parameters such as duration or path of motion.

The algorithm can initialize a timer when a light source is activated. The timer can run for at least 30 seconds and/or less than or equal to 60 seconds, or any other quantity of time. In some embodiments, the timer can run for less than 30 seconds. In some embodiments, the timer can run for about five seconds. In some embodiments, the light source will immediately turn off when the time runs out. In some embodiments, the light will remain activated so long as the sensor assembly 28 detects an object before time runs out. If the sensor assembly 28 detects the object, the timer can immediately restart, or restart when the time runs out. If the sensor assembly 28 does not detect an object before the time runs out, then the light source will turn off.

The algorithm can incorporate a delay that deactivates the sensor or otherwise prevents a light source 30 from emitting light immediately after the light source 30 deactivates. The delay can be for 1 second, 5 seconds, or any other amount of time. The delay helps prevent the user from unintentionally triggering the light source 30. During the delay period, the light source 30 will not emit light even if an object is in a sensing region during the delay period. If the sensor assembly 28 detects an object after the delay period, the light sources 30 can emit light again.

The level of light emitted from the light sources 30 does not depend solely or at all on the length of time that the user remains in the sensing region. The level of light emitted from the light sources 30 can differ depending on the location of the user in a different sensing region, even if certain other parameters are the same (such as the length of time that the user is sensed in a region).

Figure 13:
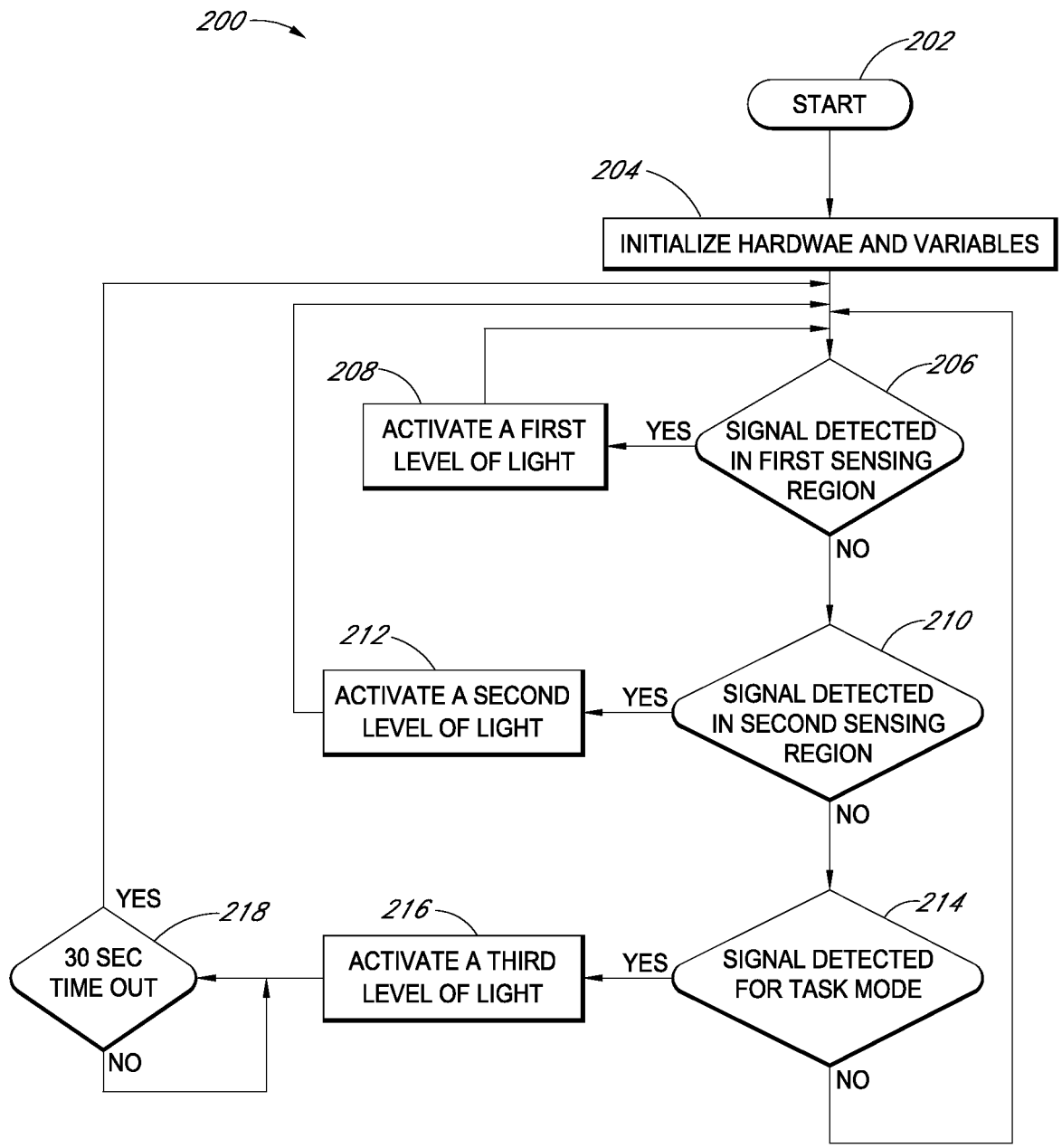
FIG. 13 illustrates a block diagram of an embodiment of an algorithm that can be carried-out by components of the mirror assembly of FIG. 1.

The mirror assembly 2 can also include an algorithm configured to send a command to trigger the light sources 30 to activate based on the detected signal. For example, the algorithm 200 can resemble the flow chart depicted in FIG. 13. Beginning at start block 202, the controller initializes mirror assembly hardware and variables in operation block 204. Moving on to decision block 206, if the signal is detected in a first sensing region, then the controller activates first level of light in operation block 208. If a signal is not detected in a first sensing region, then the algorithm moves on to decision block 210.

If a signal is detected in a second region, then the controller activates a second level of light in operation block 212. If a signal is not detected in a second sensing region, then the algorithm moves on to decision block 214. If a signal is detected for a task mode then the controller activates a third level of light in operation block 216.

The third level of light can be a power saving level of light, such as if the user plans to keep the light source 30 activated for a relatively long period of time (e.g., 30 minutes or longer). After the third level of light is activated, a timer is initialized (block 218). The timer can be for 30 seconds or any other period of time. If a user is not detected within the sensing region during the 30 second timer, then the light source 30 turns off and the algorithm returns to just after the hardware and variables initialization in operation block 104. If a user is detected in a sensing region within the 30 second timer, then the 30 second timer repeats itself.

In some embodiments, the mirror assembly 2 can include an algorithm configured to maintain the light source (e.g., LED) brightness at a generally constant level even as the battery capacity is nearing the end of its life (necessitating a recharge) by adjusting the electrical characteristics of the power source supplied to the light source depending on the stage of battery life (e.g., increasing the voltage as the current decreases or increasing the current as the voltage decreases).

Algorithm 200 may not include all of the blocks described above, or it may include more decision blocks to account for additional sensing regions, other modes, or other parameters as described throughout this disclosure.

In some embodiments, the mirror assembly 2 can include an algorithm configured to detect whether the mirror was inadvertently activated, such as with a false trigger or by the presence of an inanimate object. For example, when the sensor detects an object, the controller can initialize a timer. If the mirror assembly 2 does not detect any movement before the timer runs out, then the light sources will turn off. If the mirror assembly 2 does detect movement, then the timer can re-initialize.

As noted above, the mirror assembly 2 can include a processor, which can control, by various scheme and algorithms, input and output characteristics and functions of the mirror assembly 2. The mirror assembly 2 can also include memory, such as firmware, to store the various control schemes and algorithms, as well certain instructions and/or settings related to various characteristics of the mirror assembly 2. For example, the memory can include instructions and/or settings regarding the size of the sensing regions, the sensitivity of the sensors, the level of output light, the length of various timers, and otherwise.

The mirror assembly 2 can be configured such that a user can modify (e.g., update, program, or otherwise) the memory, such as by connecting the mirror assembly 2 to a computer. For example, the mirror 2 can be communicatively connected with a computer via the port 24 (e.g., using a USB, cable). Data can be transferred between the computer and the mirror assembly 2 via the port 24. The mirror assembly 2 can alternatively be configured to communicate with a computer wirelessly, such as by a cellular, Wi-Fi, or Bluetooth® network, infrared, or otherwise.

When the mirror assembly 2 is in communication with the computer, a control panel may be displayed on the computer. The control panel may allow the user adjust various input and output characteristics for the mirror assembly 2. For example, a user can use the control panel to adjust the output of the emitting portions 36a and 36b and/or the sensitivity of the transmitter 36a, 36b. The user can also configure the light levels associated with the first and second sensing regions. In another example, the user can adjust the size (e.g., depth, width, and/or height) of one or more of the sensing regions. In some implementations, the user can use the control panel to modify the operation and output (e.g., intensity and/or color of the light) of the light source 30 based on certain conditions, such as the time of day, level of ambient light, amount of battery power remaining, and otherwise. In certain variants, the ability to modify the operational parameters of the mirror assembly 2 with the control panel can reduce or obviate the need for one or more adjustment devices (e.g., buttons, knobs, switches, or the like) on the mirror assembly 2, thereby providing a generally uniform exterior surface of the mirror assembly 2 (which can facilitate cleaning) and reducing the chance of unintentional adjustment of the operational parameters (such as when transporting the mirror assembly 2).

When the mirror assembly 2 is in communication with the computer, data can be transferred from the mirror assembly 2 to the computer. For example, the mirror assembly 2 can transfer data, such as power consumption, estimated remaining battery power, the number of activations and/or deactivations of the light source 30, the length of use (e.g., of individual instances and/or in total) of the light source 30, and otherwise. Software can be used to analyze the transferred data, such as to calculate averages, review usage statistics (e.g., during specific periods), recognize and/or draw attention to unusual activity, and display usage statistics on a graph. Transferring usage statistics from the mirror assembly 2 to the computer allows the user to monitor usage and enables the user to calibrate different characteristics of the mirror assembly 2 (e.g., based on previous usage and parameters). Transferring data from the mirror assembly 2 to the computer can also reduce or avoid the need for one or more adjustment or display devices on the mirror assembly itself.

When the mirror assembly 2 is in communication with the computer, the mirror the computer can also transfer data to the mirror assembly 2. Furthermore, when the mirror assembly 2 is in communication with the computer, electrical potential can be provided to the battery 26 before, during, or after such two-way data transfer.

Although the vanity mirror has been disclosed in the context of certain embodiments and examples, it will be understood by those skilled in the art that the present disclosure extends beyond the specifically disclosed embodiments to other alternative embodiments and/or uses of the subject matter and obvious modifications and equivalents thereof. In addition, while several variations of the vanity mirror have been described in detail, other modifications, which are within the scope of the present disclosure, will be readily apparent to those of skill in the art based upon this disclosure. It is also contemplated that various combinations or sub-combinations of the specific features and aspects of the embodiments can be made and still fall within the scope of the present disclosure. It should be understood that various features and aspects of the disclosed embodiments can be combined with or substituted for one another in order to form varying modes of the vanity mirror. Thus, it is intended that the scope of the subject matter herein disclosed should not be limited by the particular disclosed embodiments described above.

The following is claimed:

1. A mirror assembly comprising:
    a housing portion;
    a generally circular mirror coupled with the housing portion;
    a light source disposed at a periphery of the mirror;
    a substantially circular light pipe having a length and being positioned around at least a portion of the periphery of the mirror; and
    a light scattering region disposed along the length of the light pipe, the light scattering region comprising a plurality of light scattering elements having a pattern density determined by spatially varying the light scattering elements, the light scattering region configured to encourage a portion of the light impacting the light scattering elements to be emitted out of the light pipe and toward a user of the mirror, the pattern density of light scattering elements being less dense in a region near the light source and the pattern density of light scattering elements being greater in a region generally opposite the light source along the periphery of the mirror, thereby facilitating a substantially constant amount of light emitted along the length of the light pipe.

2. The mirror assembly of claim 1, wherein the scattering region is comprised of light scattering elements in the region generally adjacent the light source that are smaller than light scattering elements in the region generally opposite the light source.

3. The mirror assembly of claim 2, wherein the light scattering elements are generally uniformly distributed along at least a portion of the light pipe.

4. The mirror assembly of claim 1, wherein the light source is positioned near an upper portion of the mirror.

5. The mirror assembly of claim 1, wherein the light pipe is a light pipe disposed along substantially all of the periphery of the mirror.

6. The mirror assembly of claim 1, wherein the light source emits light in a direction generally orthogonal to a viewing surface of the mirror.

7. The mirror assembly of claim 1, wherein the light pipe comprises a first end and a second end, and wherein the light source emits light into the first end and another light source emits light into the second end.

8. A mirror assembly configured to provide an illuminated reflection of a user, the mirror assembly comprising:
    a mirror;
    at least one light source disposed at a periphery of the mirror;
    a light-conveying pathway configured to receive light from the at least one light source and to convey substantially constant light along a periphery of the mirror;
    a proximity sensor configured to detect a presence of the user in front of the mirror assembly; and
    a controller in electrical communication with the proximity sensor, the controller being configured to activate the at least one light source to illuminate the user when the proximity sensor detects the presence of the user in front of the mirror assembly, and to deactivate the at least one light source if the proximity sensor does not detect the presence and/or movement of the user for a predetermined period of time;
    wherein after the proximity sensor detects the presence of the user, the proximity sensor is configured to have increased sensitivity by increasing a trigger zone distance or by increasing the sensitivity to movement within a trigger zone.

9. The mirror assembly of claim 8, further comprising a support attached to the mirror, a shaft coupled to the support behind the mirror, and a base coupled to the shaft.

10. The mirror assembly of claim 9, further comprising a rechargeable battery located in the base.

11. The mirror assembly of claim 8, wherein an intensity of light emitted by the at least one light source is adjustable.

12. The mirror assembly of claim 11, wherein the intensity of light emitted by the at least one light source is configured to be adjustable by a user's hand.

13. The mirror assembly of claim 8, wherein the light-conveying pathway is generally circular.

14. The mirror assembly of claim 8, wherein the light-conveying pathway is generally circular.

15. The mirror assembly of claim 8, wherein the controller is configured to gradually increase a level of light emitted from the at least one light source when the at least one light source is activated.

16. The mirror assembly of claim 15, wherein the controller is configured to gradually decrease the level of light emitted from the at least one light source when the at least one light source is deactivated.

17. The mirror assembly of claim 15, wherein upon no longer detecting the presence of the user in front of the mirror assembly, the controller is configured to decrease an amount of emitted light from the at least one light source for a predetermined amount of time, and wherein after the predetermined amount of time, the controller is configured to deactivate the light source.

18. The mirror assembly of claim 11, wherein the intensity of light emitted by the at least one light source is configured to be adjustable by a user's hand.

19. The mirror assembly of claim 8, wherein the light-conveying pathway is generally circular.

\* \* \* \* \*